US 11,911,852 B2

(12) United States Patent
Kramer et al.

(10) Patent No.: US 11,911,852 B2
(45) Date of Patent: Feb. 27, 2024

(54) ANALYSIS OF LASER BEAMS IN SYSTEMS FOR A GENERATIVE MANUFACTURING PROCESS

(71) Applicant: Primes GmbH Meßtechnik für die Produktion mit Laserstrahlung, Pfungstadt (DE)

(72) Inventors: Reinhard Kramer, Pfungstadt (DE); Otto Märten, Dreieich (DE); Stefan Wolf, Groß-Gerau (DE); Roman Niedrig, Berlin (DE)

(73) Assignee: Primes GmbH Meßtechnik für die Produktion mit Laserstrahlung, Pfungstadt (DE)

(*) Notice: Subject to any disclaimer, the term of this patent is extended or adjusted under 35 U.S.C. 154(b) by 892 days.

(21) Appl. No.: 16/306,430

(22) PCT Filed: Jan. 25, 2017

(86) PCT No.: PCT/DE2017/000011
§ 371 (c)(1),
(2) Date: Nov. 30, 2018

(87) PCT Pub. No.: WO2017/137022
PCT Pub. Date: Aug. 17, 2017

(65) Prior Publication Data
US 2019/0217422 A1 Jul. 18, 2019

(30) Foreign Application Priority Data
Feb. 8, 2016 (DE) .................. 102016001355.9

(51) Int. Cl.
*B23K 26/70* (2014.01)
*B23K 26/042* (2014.01)
(Continued)

(52) U.S. Cl.
CPC ............ *B23K 26/705* (2015.10); *B22F 10/28* (2021.01); *B22F 10/31* (2021.01); *B22F 12/44* (2021.01);
(Continued)

(58) Field of Classification Search
CPC .. B23K 26/705; B23K 26/042; B23K 26/082; B23K 26/342; B23K 26/032;
(Continued)

(56) References Cited

U.S. PATENT DOCUMENTS 4,074,937 A * 2/1978 Zanoni ............... G01B 9/02039
356/153
5,133,987 A 7/1992 Spence et al.
(Continued)

FOREIGN PATENT DOCUMENTS

DE 4112695 A1 7/1992
DE 102007062129 B3 6/2009
(Continued)

OTHER PUBLICATIONS

English Translation of Abstract of German Patent Application No. 4112695 dated Nov. 27, 2018.
(Continued)

*Primary Examiner* — John J Norton
*Assistant Examiner* — Franklin Jefferson Wang
(74) *Attorney, Agent, or Firm* — McDonnell Bochnen Hulbert & Berghoff LLP

(57) ABSTRACT

The invention relates to a method and a device for the analysis of energy beams in systems for the additive manufacture of components (70) by means of layered solidification of a construction material (55) by an energy beam (30). The invention enables a determination of position-related beam data directly with respect to the processing point during the machining process. An additive manufacturing
(Continued)

system includes a beam deflecting device (40), a processing plane (45), and a layer applicator (60). The device according to the invention comprises a movable beam barrier (17), a movable beam sampling module (20) and a measuring device (10) with a radiation detector (12).

17 Claims, 20 Drawing Sheets

(51) Int. Cl.
| | | |
|---|---|---|
| B29C 64/135 | (2017.01) | |
| B29C 64/386 | (2017.01) | |
| B23K 26/082 | (2014.01) | |
| B33Y 10/00 | (2015.01) | |
| B33Y 30/00 | (2015.01) | |
| B29C 64/153 | (2017.01) | |
| G01J 1/42 | (2006.01) | |
| B29C 64/268 | (2017.01) | |
| G01J 1/04 | (2006.01) | |
| B23K 26/03 | (2006.01) | |
| B23K 26/342 | (2014.01) | |
| B23K 26/06 | (2014.01) | |
| B29C 67/00 | (2017.01) | |
| G02B 26/10 | (2006.01) | |
| G01J 1/02 | (2006.01) | |
| B22F 10/28 | (2021.01) | |
| B22F 12/44 | (2021.01) | |
| B22F 12/49 | (2021.01) | |
| B22F 12/90 | (2021.01) | |
| B22F 10/31 | (2021.01) | |

(52) U.S. Cl.
CPC .............. *B22F 12/49* (2021.01); *B22F 12/90* (2021.01); *B23K 26/032* (2013.01); *B23K 26/042* (2015.10); *B23K 26/0648* (2013.01); *B23K 26/082* (2015.10); *B23K 26/342* (2015.10); *B29C 64/135* (2017.08); *B29C 64/153* (2017.08); *B29C 64/268* (2017.08); *B29C 64/386* (2017.08); *B29C 67/00* (2013.01); *B33Y 10/00* (2014.12); *B33Y 30/00* (2014.12); *G01J 1/0266* (2013.01); *G01J 1/0411* (2013.01); *G01J 1/0414* (2013.01); *G01J 1/4228* (2013.01); *G01J 1/4257* (2013.01); *G02B 26/101* (2013.01); *B22F 2999/00* (2013.01); *G01J 2001/4261* (2013.01); *Y02P 10/25* (2015.11)

(58) Field of Classification Search
CPC .... B23K 26/0648; B23K 26/04; B33Y 10/00; B33Y 30/00; B29C 64/386; B29C 64/135; B29C 64/153; B29C 64/268; B29C 67/00; B22F 10/20; B22F 10/30; G01J 1/0266; G01J 1/0411; G01J 1/0414; G01J 1/4228; G01J 1/4257; G02B 26/101; Y02P 10/25
See application file for complete search history.

(56) References Cited

U.S. PATENT DOCUMENTS

| | | | |
|---|---|---|---|
| 5,753,171 A | 5/1998 | Serbin et al. | |
| 5,832,415 A | 11/1998 | Wilkening et al. | |
| 6,169,758 B1* | 1/2001 | Watanabe | B23K 26/705 |
| | | | 219/121.61 |
| 6,327,295 B1* | 12/2001 | Yamashita | B23K 26/705 |
| | | | 372/109 |
| 6,501,061 B1 | 12/2002 | Kitai et al. | |
| 6,646,728 B1 | 11/2003 | Tang et al. | |
| 6,967,779 B2* | 11/2005 | Fadel | G02B 3/0012 |
| | | | 359/619 |
| 8,303,886 B2 | 11/2012 | Philippi | |
| 8,410,422 B2 | 4/2013 | Bolshukhin et al. | |
| 8,803,073 B2 | 8/2014 | Philippi | |
| 2003/0173714 A1* | 9/2003 | Ueno | B33Y 30/00 |
| | | | 264/401 |
| 2006/0202115 A1* | 9/2006 | Lizotte | B23K 26/04 |
| | | | 250/234 |
| 2007/0045253 A1* | 3/2007 | Jordens | B23K 26/40 |
| | | | 219/121.71 |
| 2009/0179353 A1 | 7/2009 | Philippi | |
| 2010/0264302 A1 | 10/2010 | Philippi | |
| 2014/0027421 A1 | 1/2014 | Notheis | |
| 2014/0150953 A1* | 6/2014 | Sieben | B29C 65/16 |
| | | | 156/64 |
| 2016/0193623 A1* | 7/2016 | Sugimoto | B23K 26/359 |
| | | | 216/12 |
| 2016/0236279 A1* | 8/2016 | Ashton | B22F 10/00 |
| 2017/0271843 A1* | 9/2017 | Batchelder | B33Y 30/00 |

FOREIGN PATENT DOCUMENTS

| | | | |
|---|---|---|---|
| DE | 102001016058 A1 | 10/2012 | |
| DE | 102011006553 A1 | 10/2012 | |
| DE | 102012221218 A1 | 5/2013 | |
| DE | 102013226961 A1 | 6/2015 | |
| EP | 0758952 B1 | 4/1998 | |
| EP | 0792481 B1 | 6/1998 | |
| EP | 2280816 B1 | 10/2013 | |
| JP | 2002248592 A * | 9/2002 | ......... B23K 26/0648 |
| WO | 2007147221 A1 | 12/2007 | |
| WO | 2009108543 A2 | 9/2009 | |
| WO | WO-2009108543 A2 * | 9/2009 | ........... B29C 64/135 |

OTHER PUBLICATIONS

English Translation of Abstract of German Patent Application No. 10 2012 221 218 dated Nov. 27, 2018.
English Translation of Abstract of German Patent Application No. 10 2013 226 961 dated Nov. 27, 2018.

* cited by examiner

ANALYSIS OF LASER BEAMS IN SYSTEMS FOR A GENERATIVE MANUFACTURING PROCESS

CROSS REFERENCE TO RELATED APPLICATIONS

The present application is a U.S. National Phase Application pursuant to 35 U.S.C. § 371 of International Application No. PCT/DE2017/000011 filed Jan. 25, 2017, which claims priority to German Patent Application No. 10 2016 001 355.9 filed Feb. 8, 2016. The entire disclosure contents of these applications are hereby incorporated by reference into the present application.

FIELD OF THE INVENTION

The invention relates to a procedure and a device for beam analysis of energy beams, in particular laser beams, in systems for the additive production of components by layered solidification of a construction material by means of energy radiation. The invention is also suitable for calibrating a generative manufacturing facility or a beam deflector system.

BACKGROUND TO THE INVENTION

Generative manufacturing processes enable the production of complex shaped three-dimensional components in one piece. In current procedures, a cycle of three steps usually has to be run through several times: 1. lowering a component platform by the layer thickness, 2. applying the mostly powdery construction material in a thin layer, 3. selectively solidifying the construction material by means of an energy beam or laser beam, which is guided, for example, line by line or meandering at the points over the layer which form the contour and the volume of the resulting component. The solidification is usually carried out by melting and "baking" (sintering) of the construction material (powder) with the underlying layer. Such procedures are therefore also referred to as "selective laser melting" (SLM).

The quality of the manufactured component, for example with respect to homogeneity, no porosity, surface quality, and dimensional stability, depends to a great extent on the uniformity and reproducibility of the energy beam used for solidification and the beam deflection device. However, the required uniformity and reproducibility over the entire processing area and over the entire processing time is usually not achieved, especially since the entire manufacturing process takes a relatively long time. Thermal and other long-term effects can cause beam power or laser power variations, beam diameter changes, and beam positioning changes during the manufacturing process. It therefore often requires great effort to control and regulate the manufacturing process. Nevertheless, the acquisition of data, particularly beam data at the processing site, which is ideally needed for process control, is difficult, inaccurate, or not possible during processing (i.e., online).

A procedure for producing a three-dimensional object by solidifying superimposed layers has been registered under patent no. DE 41 12 695 C3. In the disclosed procedure, the surface or contour of the object is measured after solidification of a layer. Correction values are determined from a comparison of the measurement results with the specified data of the object and are used in the solidification of the subsequent layer. Thus, this procedure can detect changes in the manufacturing process caused by changes in beam data or beam position data only indirectly and, moreover, only once the changes already manifest themselves in the built-up layer.

Patent no. DE 10 2007 062 129 B3 likewise shows a procedure for producing a three-dimensional object by layered solidifying of a construction material. In this case, the power of the laser used to solidify the layer is measured during the manufacturing process, and the laser power is controlled depending on the measured value. To measure the power, a fraction of the beam is decoupled by means of a partially transparent mirror, which is arranged in the beam path in front of the beam deflecting device. Thus, even small changes in beam power can be detected and corrected with that procedure before the changes in the built-up layer become visible. However, this disclosed procedure is incapable of detecting the beam power at the processing site. Thus, changes caused by the beam deflector remain unrecognized. Furthermore, changes in the beam positioning cannot be detected and corrected with the described procedure.

Another approach for improving a generative manufacturing process is disclosed in DE 10 2012 221 218 A1. It shows a device for the quality assurance of laser-processed products. In particular, a device for detecting and recording the temperature at the processing site in real time during processing is proposed. The determination of the temperature by means of an IR-sensitive optical detector, such as a pyrometer. The laser parameters are controlled in real time based on the acquired data. Therefore, although the effects of changes in the beam parameters can be reduced by the controller, you cannot determine whether the temperature changes are caused by variations in the laser power or, for example, by changes in the beam diameter. Furthermore, changes in the beam positioning cannot be detected or corrected with this procedure either.

The beam positioning in the processing plane has a direct influence on the precision, dimensional and contour accuracy of the components being manufactured. The beam positioning must therefore usually be calibrated. A procedure customary for calibration is shown, for example, in EP 0 792 481 B1. It discloses a procedure and device for calibrating the laser beam deflection control for rapid prototyping systems. In this case, a test pattern, such as a coordinate grid, is generated by irradiating a photosensitive medium with a laser beam at predetermined target positions. The test image is digitized with an image recording device and the actual positions compared with the desired positions, from which correction data for the controller are obtained. This procedure therefore requires accessibility to the processing plane. Therefore, the disclosed procedure cannot be used to detect the change in beam position data during the manufacturing process in generative manufacturing, in other words, online, because the processing plane is usually not accessible in generative manufacturing even between individual layer solidification steps. In addition, no other beam data, such as the beam power, can be obtained with this procedure.

U.S. Pat. No. 6,501,061 B1 and DE 10 2011 006 553 A1 show procedures and devices for position-related detection of beam data, for example. In these procedures, apertures or pinholes with a downstream or lower detector are placed at different positions in the processing plane. The apertures or pinholes are scanned by the laser beam using the beam deflector. Different position-related values can be determined from the detector signal and its correlation with the controller of the beam deflection device such as the beam position, beam diameter, or beam profile. The arrangement of apertures, pinholes, and detectors in the processing planes and below requires free accessibility to the processing area. Thus, while the disclosed devices are useful for calibrating a beam deflector prior to processing, they are not suitable for online acquisition in a generative manufacturing process.

EP 2 280 816 B1 lists another procedure and a device for calibrating an irradiation device. In this procedure, an image converter plate is used which emits detectable light when the irradiation device irradiates predetermined positions of the image converter plate. The image converter plate may have a shadow mask, for example. The image converter plate is scanned with the irradiation device and coordinates are determined from the detection of the detectable light which are compared with predetermined reference coordinates. The image converter plate must be installed in the processing plane for this purpose. Thus, the disclosed procedure is suitable for calibrating the irradiation device prior to starting a manufacturing process. However, this procedure is also not suitable for the online detection of beam position data changes. The determination of other beam data such as the beam power is not provided for.

The known devices for beam analysis or for position calibration of the beam-positioning device or the beam deflection device in laser processing systems with positionable energy beams or laser beams, such as in scanner systems, therefore require the installation of a measuring or a position-selective device directly in the processing plane. However, such devices are not suitable for beam control or process control in generative manufacturing equipment during the manufacturing process because the processing plane, i.e., the layer building level, is inaccessible in these systems. Even the area immediately above the layer building level is not accessible in the period between two layers, since this area must be kept clear for the application device of the layer construction material.

Accordingly, the known procedures for process control in additive manufacturing systems concern controlling the solidification process by regulation of process parameters as a. function of, for example, thermal measurements in the material layer or at the processing site, or to inspecting the material layer surface for defects, pores, poor connectivity, etc. However, these known procedures are not able to detect the possible causes of deficient layer structure, which often come about through changes or variations of the beam parameters.

Accordingly, no state-of the-art devices or procedures are known which are capable of directly detecting different position-related beam data for the machining point during the long-lasting machining process in additive manufacturing systems and optimizing the machining process based on this beam data.

BRIEF DESCRIPTION OF THE INVENTION

The invention is therefore based on the objective of providing a procedure and a device that allow a determination of position-related beam data directly with respect to the processing point during the machining process in additive manufacturing systems.

In order to solve the task, a method for determining at least one beam datum in a for the additive production of components by means of layered solidification of a construction material by an energy beam is being proposed. The additive manufacturing system includes a beam deflecting device, a processing plane, and a layer applicator. The procedure includes the following procedure steps. A beam barrier is positioned in the beam path between the beam deflecting device and at least one selected processing coordinate on the processing plane. A beam sampling module is positioned in the beam path between the beam deflecting device and the selected processing coordinate on the processing plane. The beam deflecting device is aligned to the selected processing coordinate. The energy beam is turned on for a limited time. At least a portion of the beam directed by the beam deflecting device towards the selected processing coordinate is directed to a measuring device having a radiation detector. At least one beam datum is determined by means of the measuring device. The beam barrier and the beam sampling module are positioned at a distance from the processing plane. The aforementioned process steps are performed during a production process of the component in a period of time before or after the solidification of a single component layer.

In one possible method, the aforementioned procedure steps can essentially be carried out during the application of a construction material layer.

Furthermore, a method is provided in which at least one beam datum determined by the measuring device or a value derived therefrom is transmitted to a process control unit.

There is also a method provided in which the beam sampling module is positioned at a position corresponding to the selected processing coordinate and the corresponding position in at least one of the coordinate axes x or y spanning the processing plane matches the selected processing coordinate.

In one possible method, the positioning of the beam barrier and the positioning of the beam sampling module may be coupled to the movement of the layer applicator.

Moreover, a method is provided wherein the beam deflecting device is successively aligned with a number of different selected processing coordinates on the processing plane and at least one beam datum is recorded at each of the selected processing coordinates.

In another method, the determined beam data may be used to calibrate the beam deflector.

Furthermore, a method in which the beam data for a number of different selected processing coordinates is measured in essence during a single layer job operation.

In the described methods, determining at least one beam datum may include determining one or more of the following parameters: beam power, beam energy, beam intensity, beam diameter, beam position on the processing plane, deviation of the beam position from the selected coordinate, axial focus position, axial focus position deviation from the processing plane, beam deflection speed.

The described methods may be applied in an additive manufacturing process of a component by layered solidification of a construction material, wherein the determination of beam data is performed either before each application of a single layer or at least regularly after applying a number of layers prior to building up the next number layers.

In order to solve the task, a device for determining at least one beam datum in a system for the additive manufacturing of components by means of layered solidification of a construction material by an energy beam is being proposed as well. The additive manufacturing system includes a beam deflecting device, a processing plane, and a layer applicator. The device includes a beam barrier, a jet sampling module, and a measuring device. The beam barrier and the beam sampling module are movable. The beam barrier and the beam sampling module are positionable in the beam path between the beam deflecting device and at least one selected processing coordinate on the processing plane. The beam barrier and the beam sampling module are spaced in any possible position from the processing plane. The beam sampling module is configured to direct at least a portion of the beam, which is directed toward the selected processing coordinate by meas of beam deflecting device, to the measuring device. The measuring device has a radiation detector and is set up to record at least one beam datum.

There is also a device provided in which the beam sampling module is able to be positioned at a position corresponding to the selected processing coordinate and the corresponding position in at least one of the coordinate axes x or y spanning the processing plane matches the selected processing coordinate.

The beam sampling module may be coupled to a path length measuring device for detecting a position of the beam sampling module in at least one of the coordinate axes x or y.

Moreover, a device is provided, wherein the measuring device is arranged behind an output coupling mirror, which is arranged in the beam guide of the energy beam to the beam deflecting device for uncoupling a beam which will be reflected from the beam sampling module to the beam deflecting device.

The beam sampling module may comprise at least one beam guiding element with a segment of a partially reflecting spherical surface. A center of curvature of the spherical surface may be positionable at the selected processing coordinate or at a point corresponding to the selected processing coordinate.

There is also a device provided in which the beam sampling module includes the measuring device and the measuring device is positionable together with the beam sampling module.

Moreover, a device is provided in which the measuring device is arranged outside a processing space which is defined by the possible beam paths between the beam deflecting device and the processing plane.

The beam sampling module may include at least one beam guiding element or at least one deflection mirror with an at least partially reflecting surface.

A device is provided wherein the beam barrier and the beam sampling module are movable with a linear guide which is aligned parallel to the processing plane from a park position outside the beam paths to at least one position in the beam path between the beam deflecting device and at least one selected processing coordinate on the processing plane.

A part of the beam sampling module can be designed as a beam barrier at the same time.

The beam harrier and the beam sampling module may be coupled to the layer applicator.

The measuring device may be configured to determine one or more of the following parameters: beam power, beam energy, beam intensity, beam diameter, beam position on the processing plane, deviation of the beam position from the selected coordinate, axial focus position, axial focus position deviation from the processing plane, beam deflection speed.

BRIEF DESCRIPTION OF THE FIGURES

The invention will be described in more detail with reference to the following figures, without being limited to the configurations shown. It shows.

DETAILED DESCRIPTION OF THE FIGURES

Figure 1:
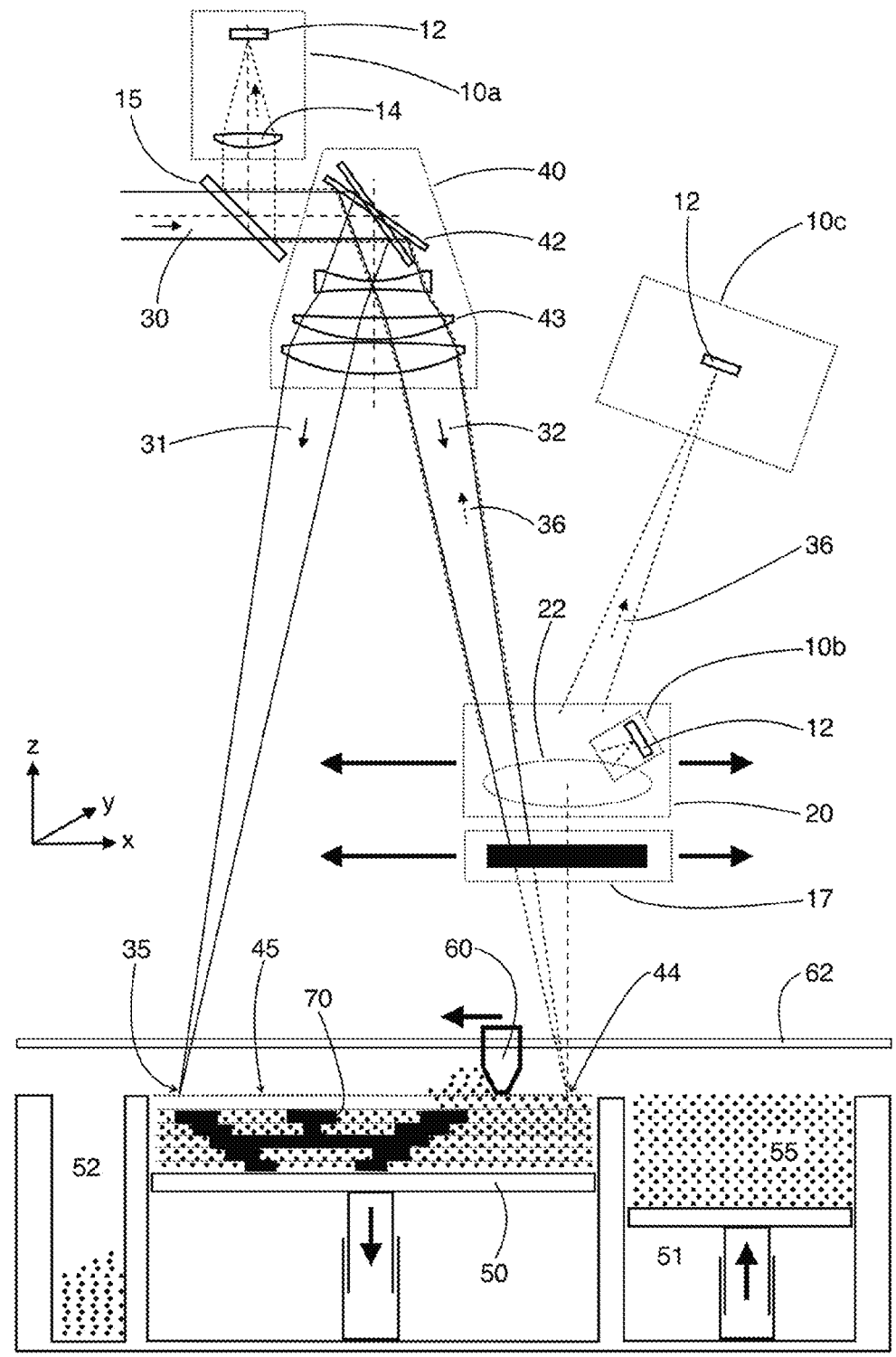
FIG. 1: A schematic representation of the invention in an additive manufacturing system. Several options for arranging the measuring device are shown simultaneously in this figure.

FIG. 1 shows the invention in a schematic representation. A system for the additive manufacturing of components 70 by means of layer-by-layer solidification of a construction material 55 by an energy beam 30 typically includes a component platform 50, on which the component 70 is built up in layers, a beam deflecting device 40, and a layer applicator 60. During a manufacturing process, the component platform 50 is first lowered by the thickness of a layer. Then, a layer of the construction material 55, which may be powdered, for example, is applied from a reservoir 51 by means of a layer applicator 60 to the lowered component platform 50 and the previously solidified layer. Excess construction material 55 can be collected in a reservoir 52 for excess construction material. The layer applicator 60 can be a wiper (squeegee), which can be moved by means of a drive and a guide 62 parallel to the processing plane 45 over the component platform 50. Subsequently, an energy beam or laser beam 30 is guided selectively over the locations of the layer for solidification by means of the beam deflecting device 40, which form the contour and the volume of the component 70 to be manufactured. For example, the beam deflecting device 40 may include at least one, typically two scanner mirrors 42 for redirecting and aligning the beam 30 and a scanning lens 43 for focusing the beam 30. The focused laser beam 31, 32 forms a beam focus 35 in the processing plane 45.

In order to determine at least one beam datum or several beam data, the period before or after the solidification of a layer should preferably be used, for example the period in which the layer is applied. For this purpose, a beam barrier 17 and a beam sampling module 20 are movable in the system. The invention further comprises a measuring device 10 with a radiation detector 12. Depending on the configuration of the invention, the measuring device 10 can be placed at different points in the system. The alternative possible arrangements of the measuring device 10 are shown in FIG. 1 with the numerals 10a, 10b and 10c.

In a first possible arrangement (numeral 10a), the measuring device 10 may be placed behind an output coupling mirror 15, which is arranged in this possible arrangement in the beam feed of the laser beam 30 to the beam deflecting device 40. The measuring device 10 in this first possible arrangement further comprises means for focusing 14, such as a lens. The beam sampling module 20 comprises at least one beam guiding element 22 in this configuration.

In a second possible arrangement (numeral 10b), measuring device 10 may be a component of the beam sampling module 20.

In a third possible arrangement (numeral 10c), the measuring device 10 may be arranged at a location outside the processing space, which is defined by the possible beam paths, for example the focused laser beams 31, 32 between the beam deflecting device 40 and the processing plane 45. The beam sampling module 20 may comprise a deflection mirror in this configuration.

To determine at least one beam datum, the beam barrier 17 and the beam sampling module 20 are displaced to a position in the beam path of the focused laser beam 32 between the beam deflecting device 40 and a selected processing coordinate 44 in the processing plane 45. By means of the beam sampling module 20, the laser beam 32 or at least a portion of the beam 36 is guided from the focused laser beam 32 to the measuring device 10. At least one beam datum is determined from a signal of the radiation detector 12.

Figure 2:
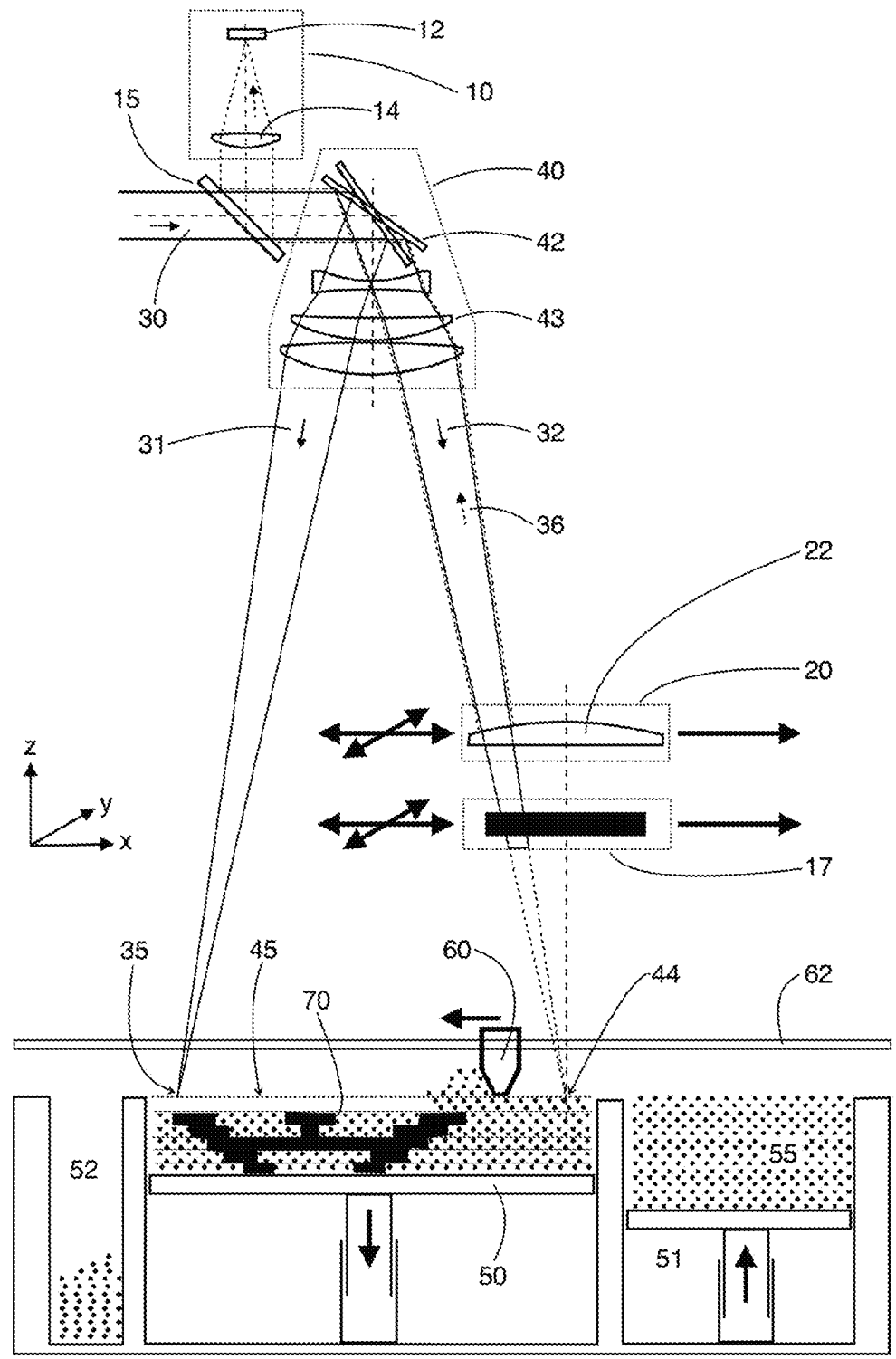
FIG. 2: A schematic representation of the invention in a configuration with a first option for the arrangement of the measuring device and with a first configuration of the beam-sampling module.

FIG. 2 shows the invention in a configuration with the first possible arrangement of the measuring device 10 behind the output coupling mirror 15 in the beam feed. In the configuration shown here, the beam sampling module 20 includes a beam guiding element 22. The beam guiding element 22 has an at least partially reflecting spherical surface. To determine at least one beam datum, the beam sampling module 20 is aligned such that the center of curvature of the spherical surface coincides with a selected processing coordinate 44 in the processing plane 45. In order to determine beam data for a number of processing coordinates 44 in the processing plane 45, the beam sampling module 20 can be moved in the direction of the coordinate axes x and y, in other words, parallel to the processing plane 45. The beam barrier 17 may be displaceable together with the beam sampling module 20.

Figure 3:
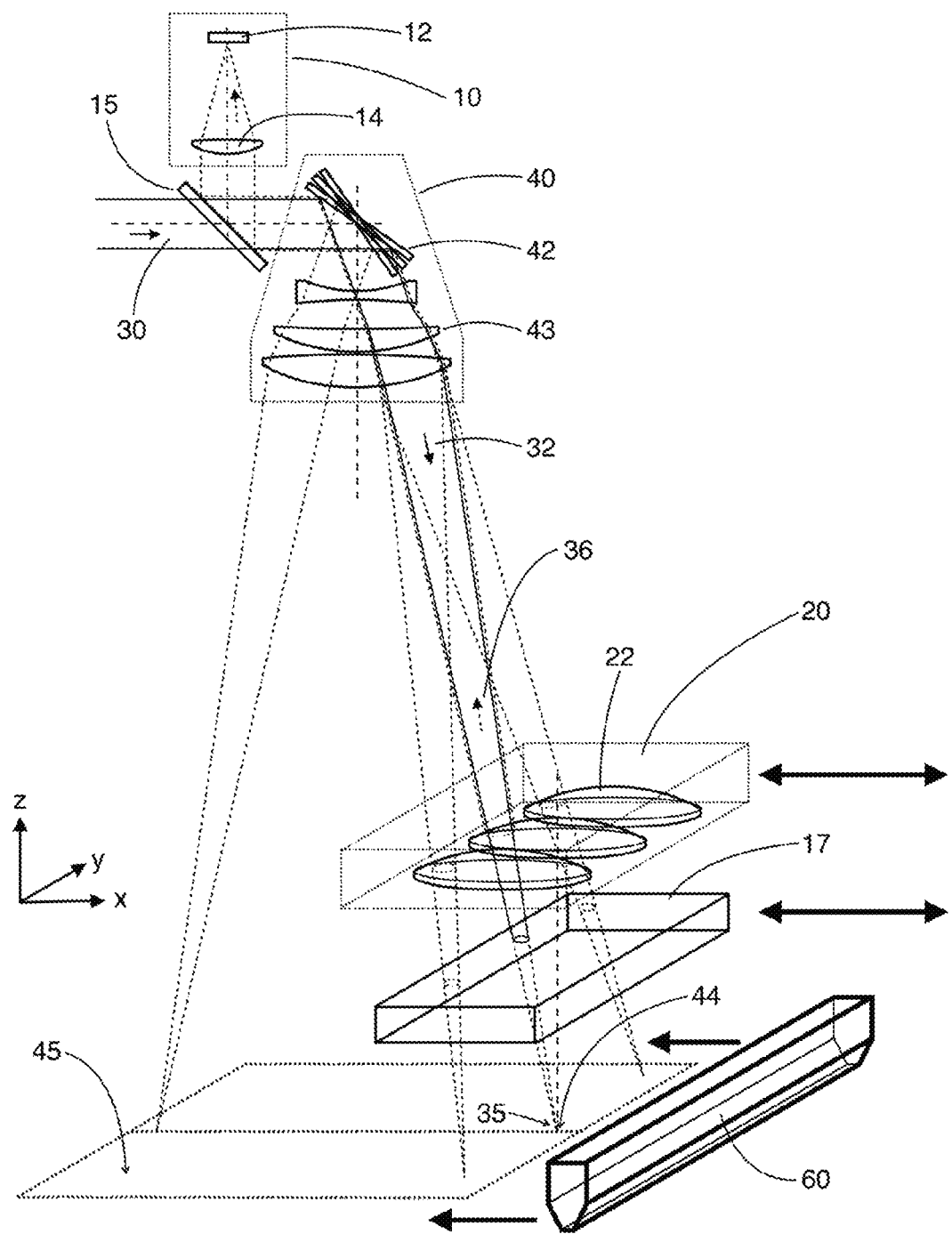
FIG. 3: A schematic, partially-perspective representation of the invention in a configuration with a first option for the arrangement of the measuring device and with a second configuration of the beam-sampling module.

FIG. 3 shows a configuration similar to that shown in FIG. 2. The beam sampling module 20 has a number of beam guiding elements 22 with spherical surfaces in this case. The beam guiding elements are arranged at different positions in the direction of the coordinate axis y, so that a number of different processing coordinates 44 can be addressed simultaneously in the y direction. The option of beam sampling module 20 displacement in the y-direction can therefore be dispensed with. Only one shift in the x direction is needed to address different coordinates in the x direction. The movement of the wiper 60 for layer application is aligned in the x-direction here as well. It is therefore possible to couple the displacement of the beam sampling module 20 and the beam barrier 17 with the movement of the wiper 60.

Figure 4:
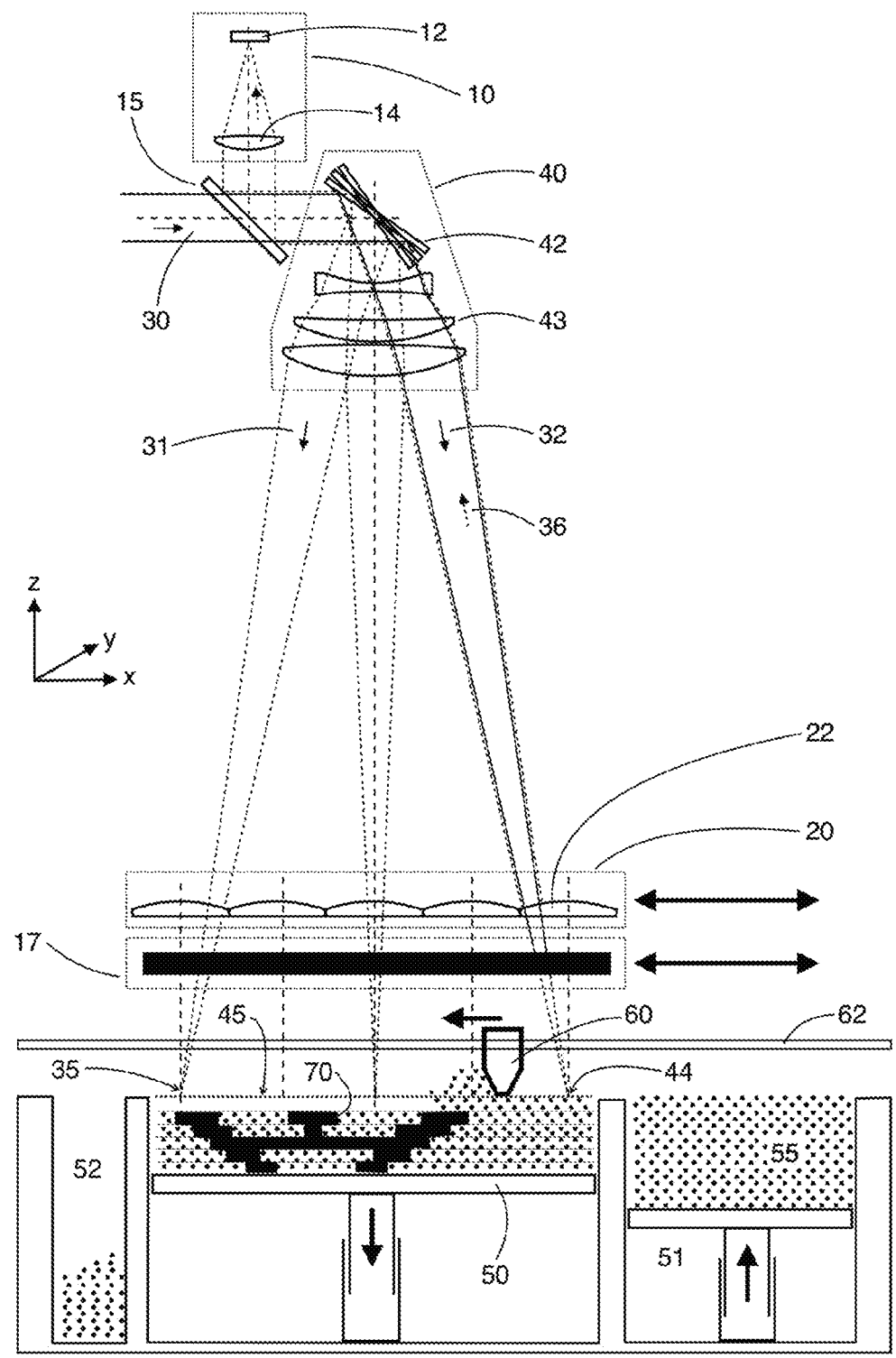
FIG. 4: A schematic representation of the invention in a configuration with a first option for the arrangement of the measuring device and with a third configuration of the beam-sampling module.

FIG. 4 shows a configuration in which a number of beam guiding elements 22 with spherical surfaces are arranged at different positions in the beam sampling module 20 in the direction of the coordinate axis x. Therefore, tracking of the beam sampling module 20 in the x direction is not needed different to address coordinates in the x direction. The beam sampling module 20 can be positioned centered over the processing plane 45 to record beam data. If different coordinates in the y-direction are to be addressed, the beam-sampling module 20 will have to be moved in the y-direction.

Figure 5:
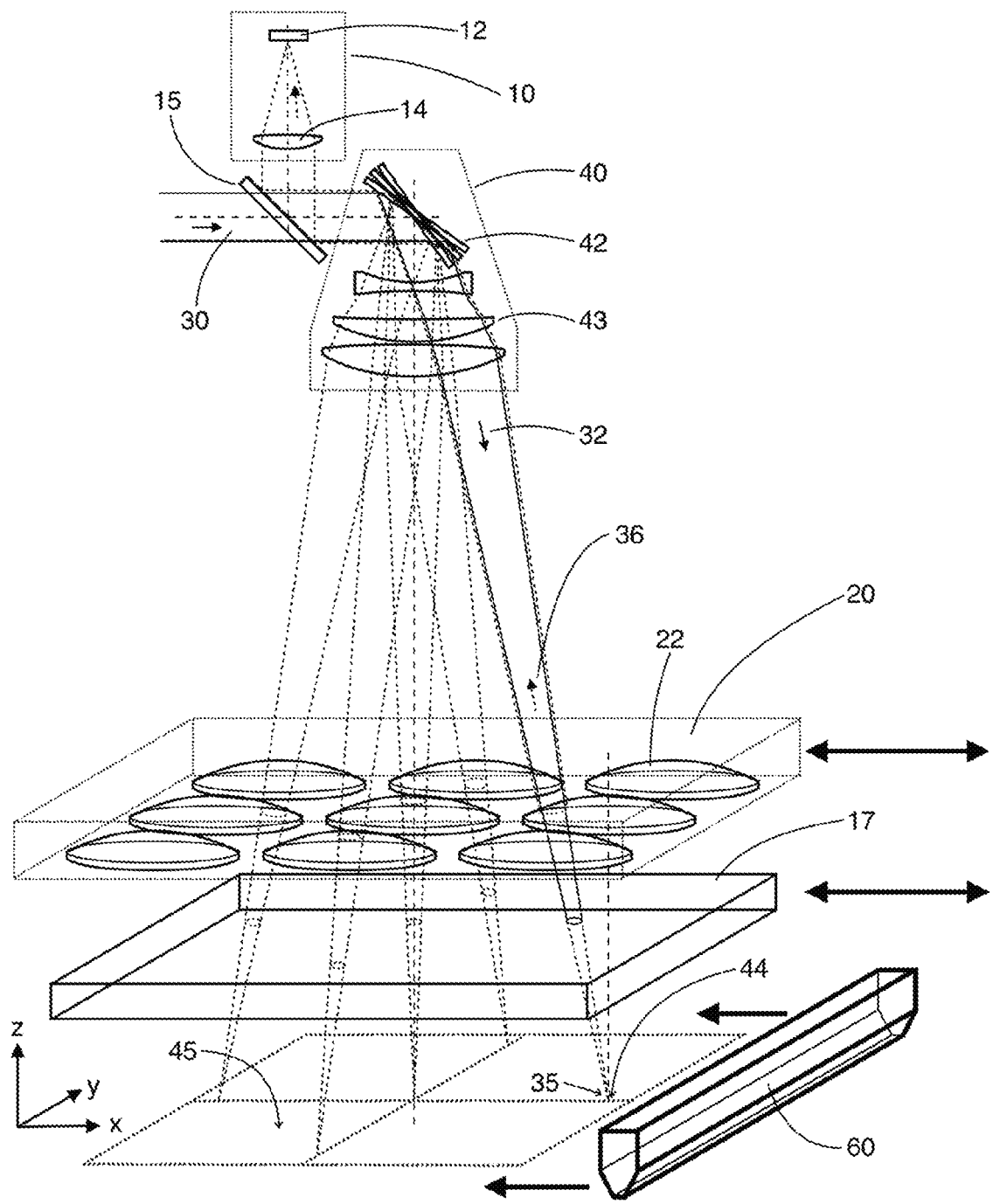
FIG. 5: A schematic, partially-perspective representation of the invention in a configuration with a first option for the arrangement of the measuring device and with a third configuration of the beam-sampling module.

In order to dispense with tracking of the beam sampling module 20 in the y-direction, the beam sampling module 20 may have additional beam guiding elements 22 with spherical surfaces, which are additionally arranged at different locations in the y-direction. FIG. 5 shows such a configuration of the invention. The beam guiding elements 22 are arranged here in the form of a matrix or an array in the beam sampling module 20.

Figure 6:
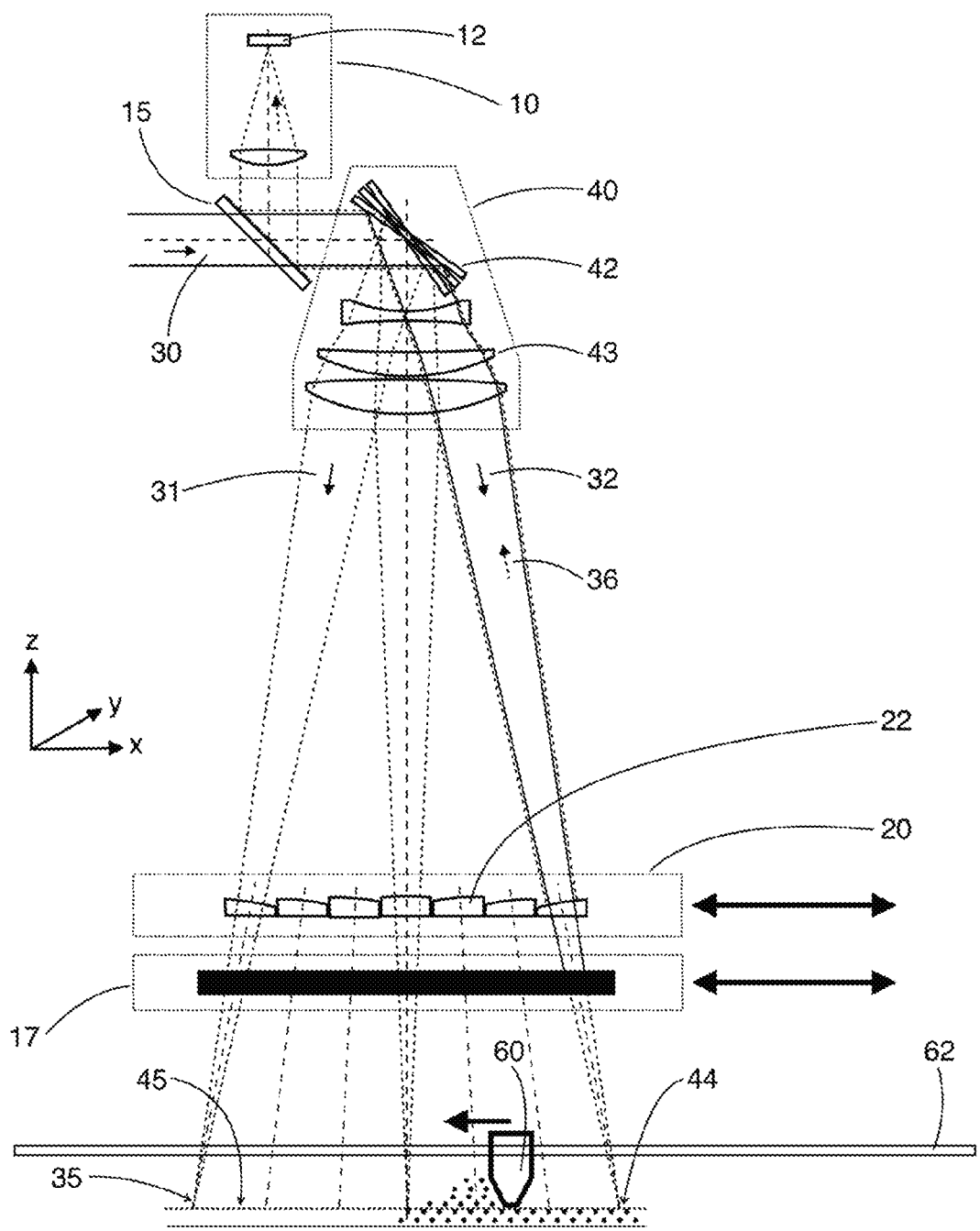
FIG. 6: A schematic representation of the invention in a configuration with a first option for the arrangement of the measuring device and with a fifth configuration of the beam-sampling module.

FIG. 6 shows a configuration similar to FIG. 4. Different sections or segments of a spherical surface are used for the spherical surfaces of the beam guiding elements 22 which are adapted in their width to the size of the beam cross section of the focused beam 32. In this way, the individual sections of the spherical surfaces or the individual beam guiding elements 22 can be arranged particularly close to each other, so that a larger number of spherical surfaces or beam guiding elements 22 can be used, and thus a larger number of different processing coordinates 44 can be addressed simultaneously.

Figure 7:
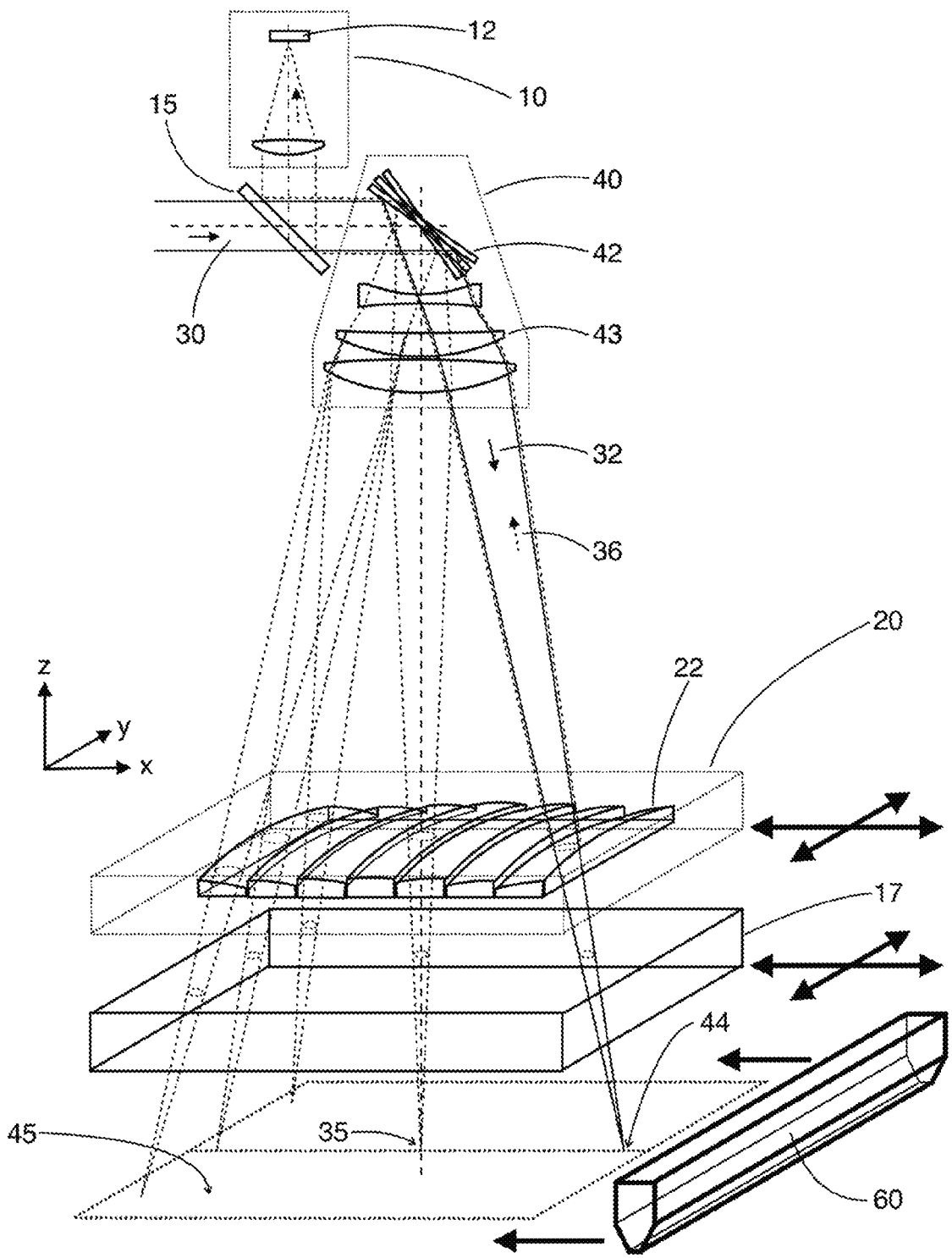
FIG. 7: A schematic, partially-perspective representation of the invention in a configuration similar to FIG. 6 with a first option for the arrangement of the measuring device and with a sixth configuration of the beam-sampling module.

FIG. 7 shows an arrangement comparable to FIG. 6 in a partially-perspective view. In order to be able to address different coordinates in the y direction, the beam sampling module 20 must be traceable in the y direction.

Figure 8:
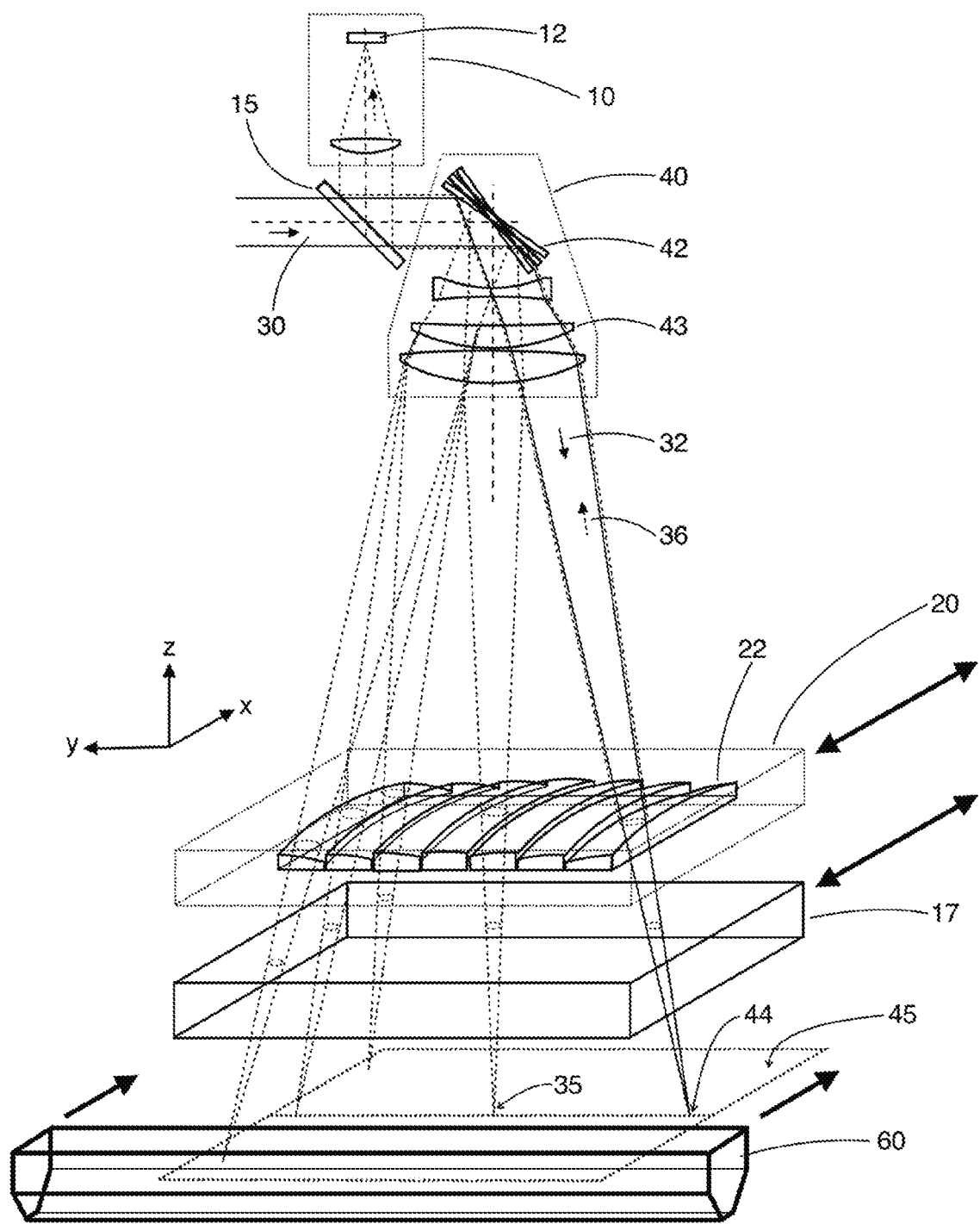
FIG. 8: A schematic, partially-perspective representation of the invention in a configuration similar to FIG. 6 with a first option for the arrangement of the measuring device and with a sixth configuration of the beam-sampling module which is movable in the same direction as the layer applicator.

FIG. 8 shows an arrangement similar to FIG. 7, but in which the spherical surfaces of the beam guiding elements 22 address different coordinates in the y direction. It is therefore only required to track the beam sampling module 20 in the x-direction to address different processing coordinates 44 distributed over the entire processing plane 45. In the configuration shown, the movement of the wiper (squeegee) 60 for layer application is aligned in the x-direction as well. It is therefore possible to couple the displacement of the beam sampling module 20 and the beam barrier 17 with the movement of the wiper 60.

Figure 9:
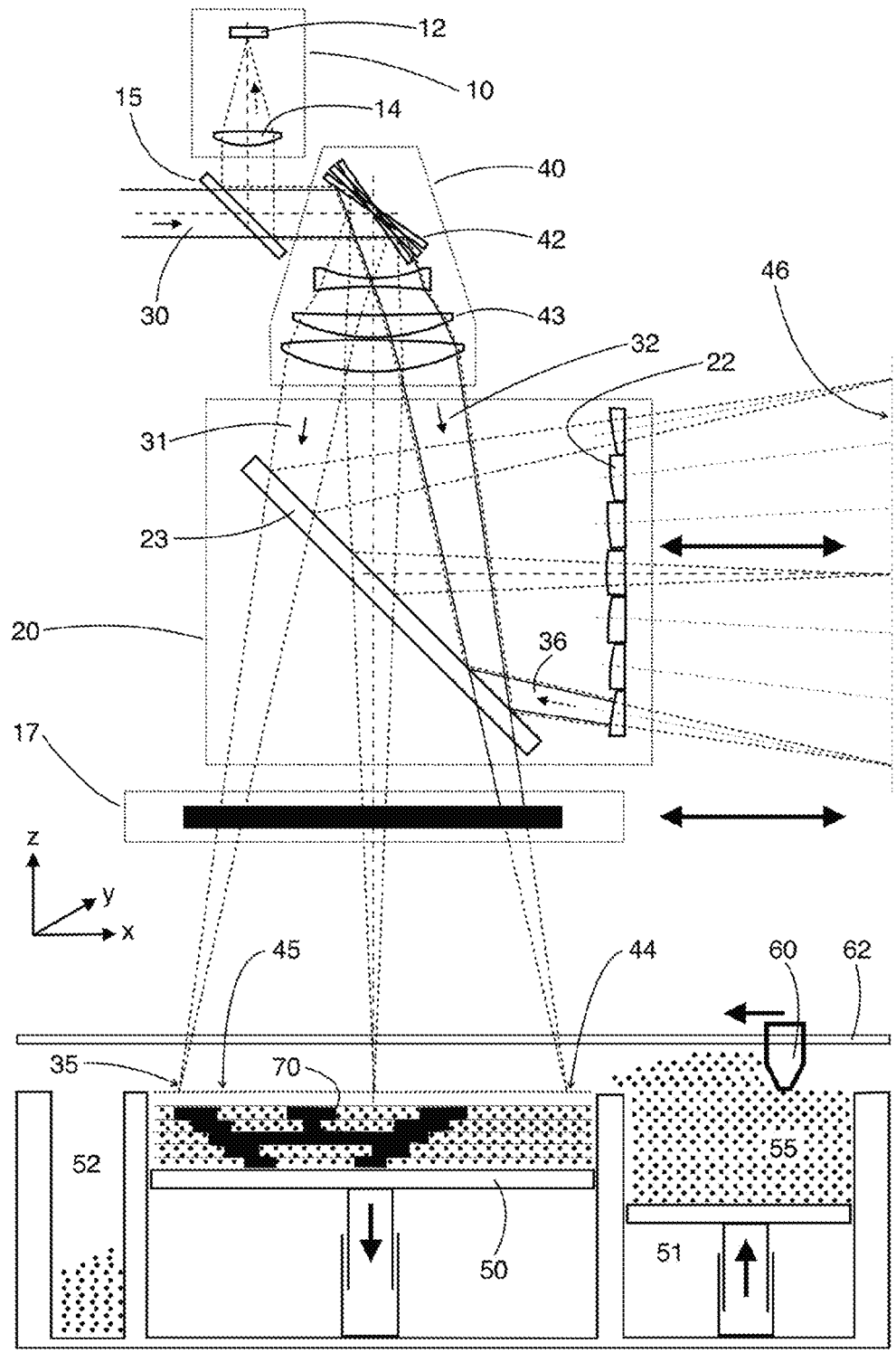
FIG. 9: A schematic representation of the invention in a configuration with a first option for the arrangement of the measuring device and with a seventh configuration of the beam-sampling module.

FIG. 9 shows another configuration with the first possible arrangement of the measuring device 10 behind the output coupling mirror 15 in the beam feed. In this case, the beam sampling module 20 comprises a number of beam guiding elements 22 with spherical surfaces and furthermore a deflection mirror 23 with an at least partially reflecting surface. By means of the deflection mirror 23, the processing plane 45 is mirrored into a virtual plane 46 corresponding to the processing plane 45. The centers of curvature of the spherical surfaces of the beam guiding elements 22 are not aligned with coordinates in the processing plane 45, but with corresponding coordinates in the virtual plane 46.

Figure 10:
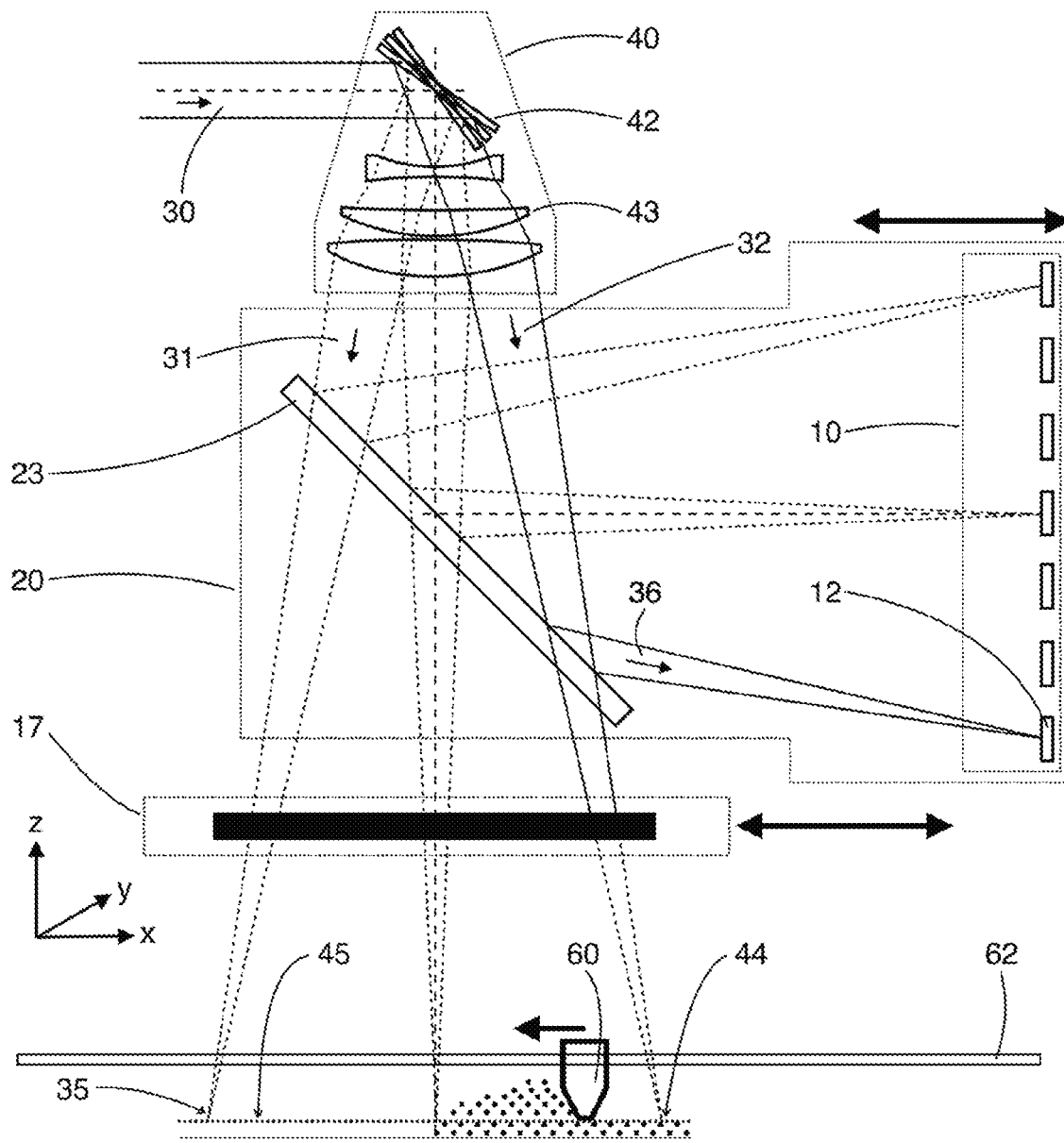
FIG. 10: A schematic representation of the invention in a configuration with a second option for the arrangement of the measuring device and with a eighth configuration of the beam-sampling module.

FIG. 10 shows a configuration of the invention with a second possible arrangement of the measuring device 10. The measuring device 10 is part of the beam sampling module 20. Moreover, the beam sampling module 20 includes a deflection mirror 23 with an at least partially reflecting surface. The deflecting mirror 23 deflects a beam portion 36 out of the focused beam 32. The focus points of the deflected beam portions 36 are located in a virtual plane which corresponds to the processing plane 45 and which is defined by the reflection of the laser beams 31, 32 focused on the processing plane 45 with the deflection mirror 23. The measuring device 10 is arranged in the virtual plane. The measuring device 10 has at least one radiation detector 12, but can also, as shown, have a number of radiation detectors 12 which are arranged in the virtual plane.

Figure 11:
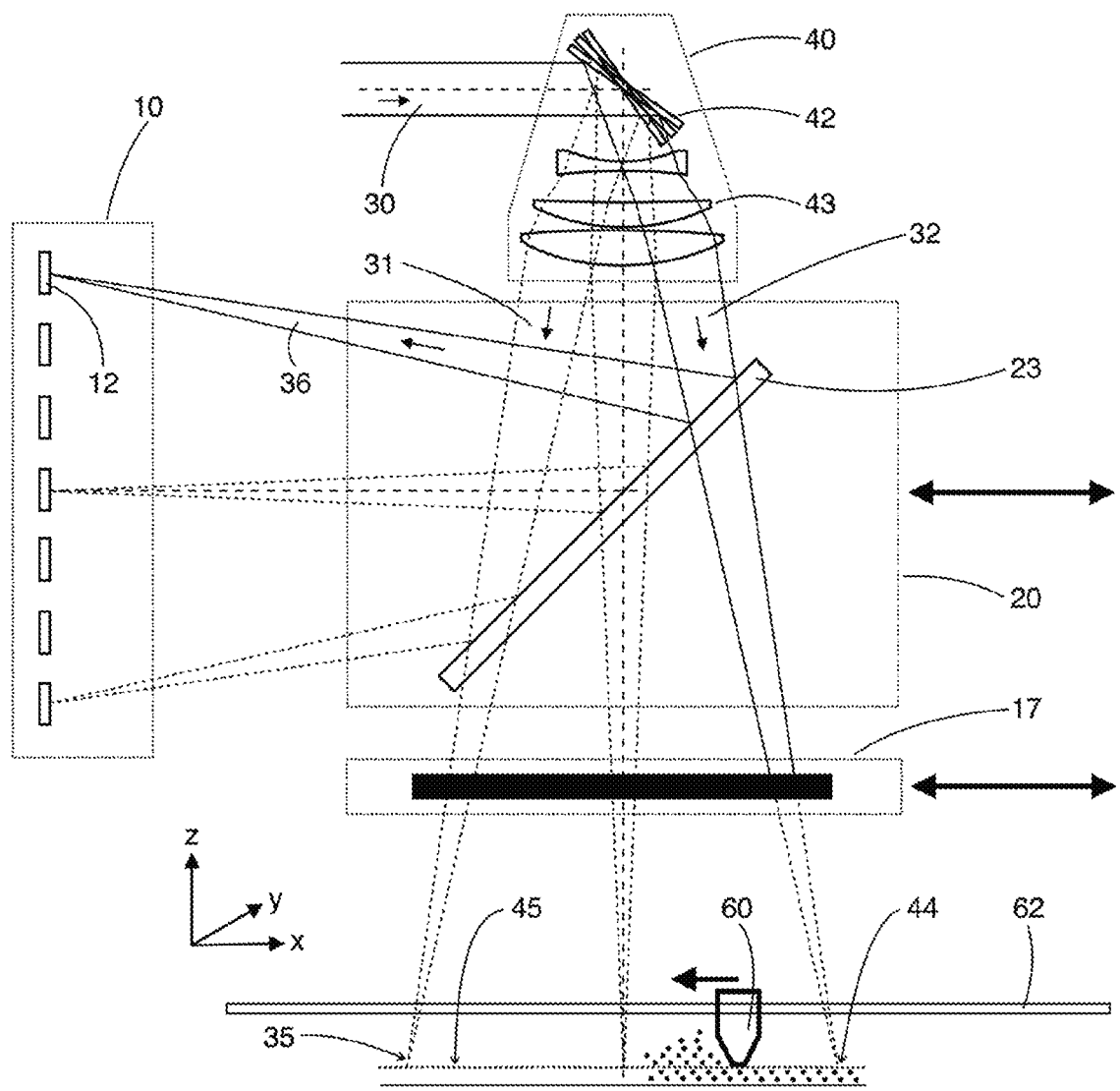
FIG. 11: A schematic representation of the invention in a configuration with a third option for the arrangement of the measuring device and with a ninth configuration of the beam-sampling module.

FIG. 11 shows a configuration of the invention with a third possible arrangement of the measuring device 10. In this case, the measuring device 10 is located at a position outside the processing space defined by the possible beam paths of the focused laser beams 31, 32 between the beam deflecting device 40 and the processing plane 45. The measuring device 10 can be situated laterally above the processing plane 45, for example. The measuring device 10 is not part of the beam sampling module 20 and does not have to be connected to it. The beam sampling module 20 comprises a deflection mirror 23 with an at least partially reflecting surface. The measuring device 10 is placed in the virtual plane, which corresponds to the processing plane 45 and which is defined by the mirroring of the laser beams 31, 32 focused on the processing plane 45 with the deflection mirror 23 when the beam sampling module 20 is positioned in a measuring position in the beam path between the beam deflecting device 40 and the processing plane 45. The measuring device 10 has at least one radiation detector 12, but can also, as shown, have a number of radiation detectors 12.

Figure 12:
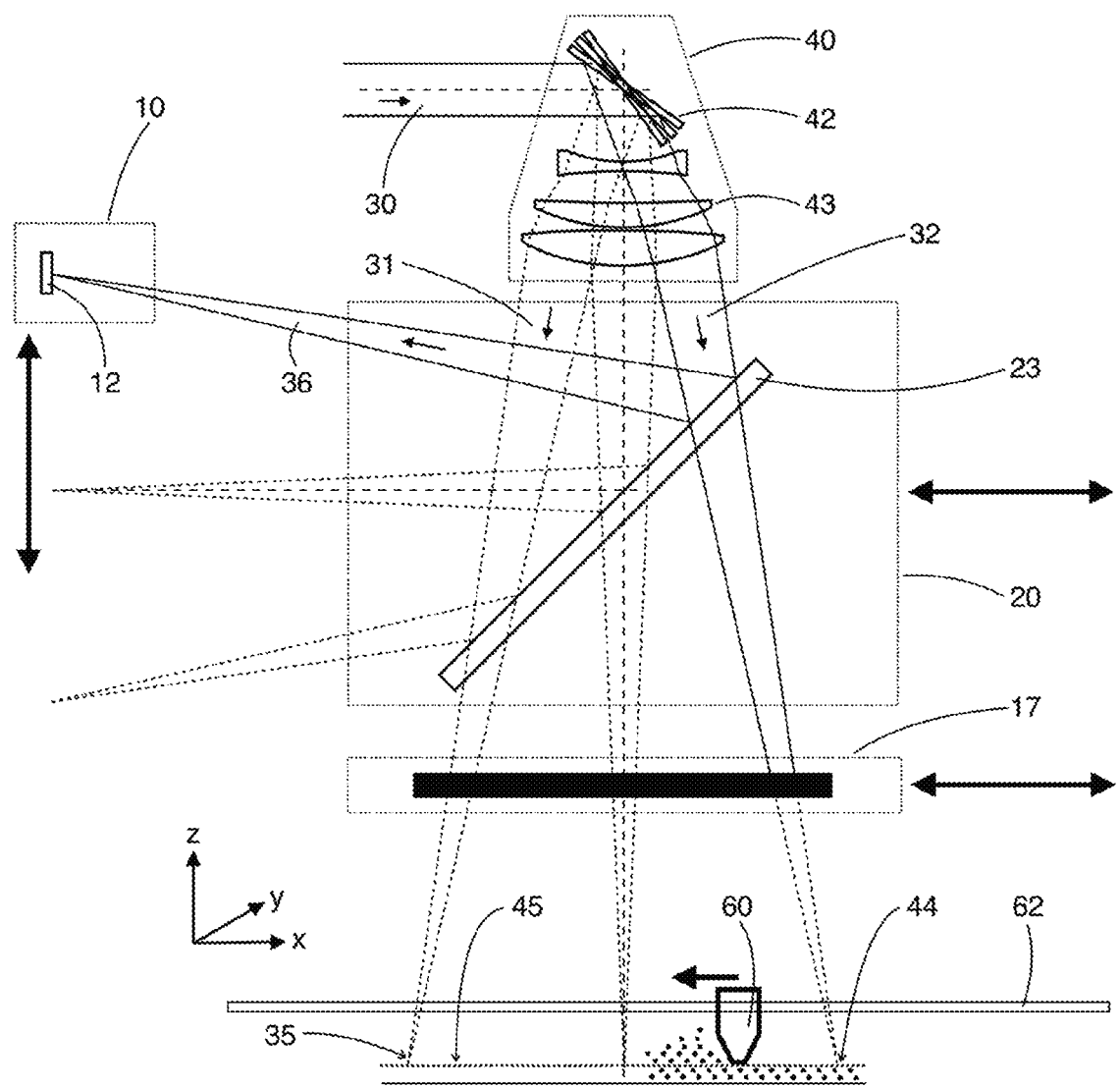
FIG. 12: A schematic representation of the invention in a configuration with a fourth option for the arrangement of the measuring device and with a ninth configuration of the beam-sampling module.

FIG. 12 shows another configuration of the invention with a fourth possible arrangement of the measuring device 10. As in the configuration of FIG. 11, the beam sampling module 20 includes a deflection mirror 23 having an at least partially reflecting surface. The measuring device 10 which is laterally placed outside the processing space has a radiation detector 12. This measuring device 10 is movable in a y-z plane in the configuration shown here. Thereby, the radiation detector 12 can be positioned at various points in the virtual plane that correspond to the corresponding processing coordinates 44 in the processing plane 45. Alternatively, the measuring device 10 can have a number of radiation detectors 12, which are arranged successively, for example, in the direction of the y-axis, as a result of which different points along the y-coordinate axis can be addressed simultaneously. Thus, tracking of the measuring device 10 is required only along the z-axis to address different points corresponding to the x-axis in the processing plane 45.

Figure 13:
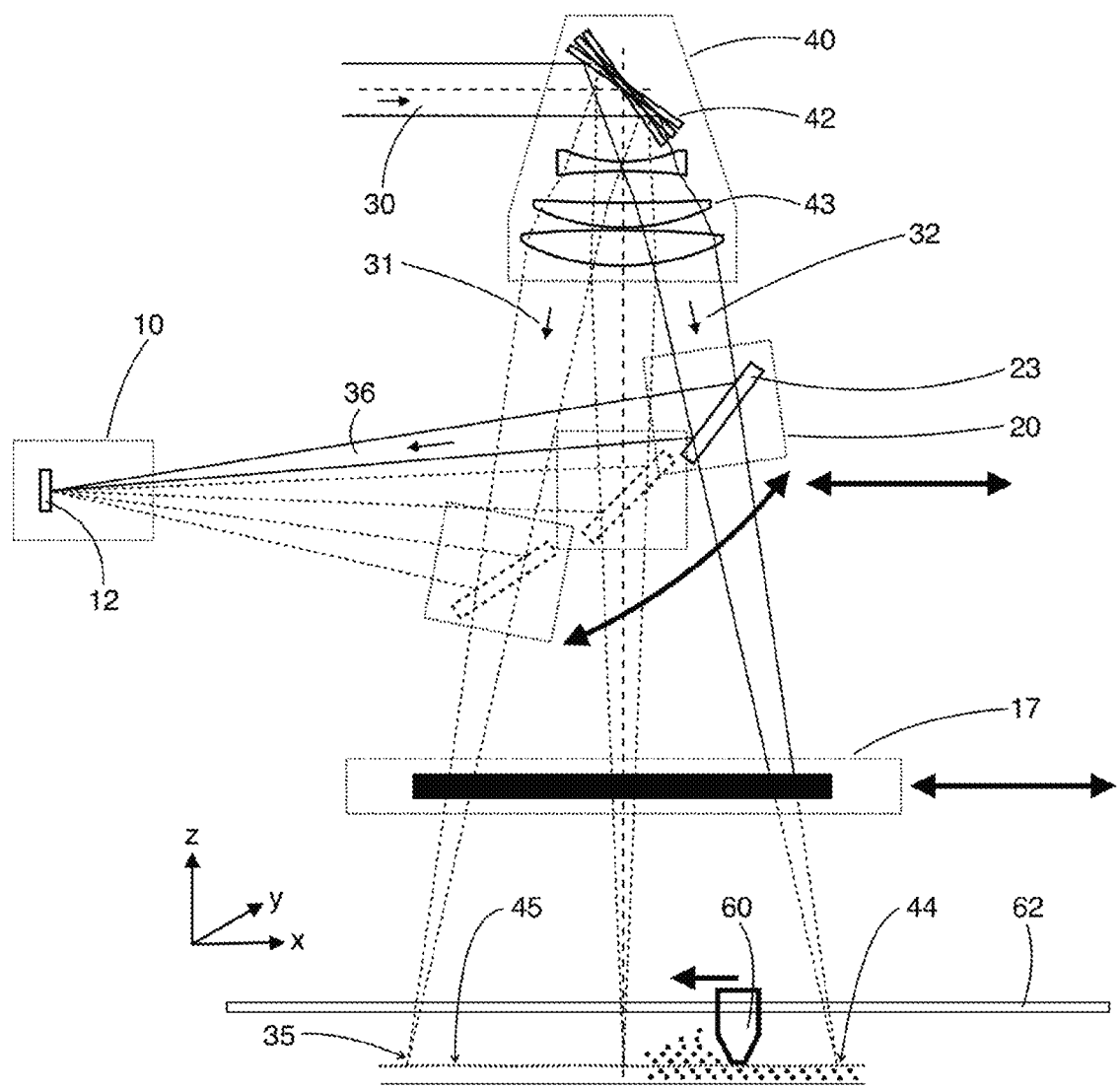
FIG. 13: A schematic representation of the invention in a configuration with a third option for the arrangement of the measuring device and with a tenth configuration of the beam-sampling module.

FIG. 13 shows a further configuration of the invention with the third possible arrangement of the measuring device 10. In this configuration, the measuring device 10 is arranged with a radiation detector 12 at a fixed position outside the processing space. The beam portion 36, which is guided from the focused beam 32 to the detector 12, is tracked in this case by the positioning and alignment of the beam-sampling module 20 with the deflection mirror 23. For this purpose, the beam sampling module 20 must be movable in all three spatial directions and be additionally pivotable about two spatial axes. The deflection mirror 23 may have smaller dimensions in this configuration.

Figure 14:
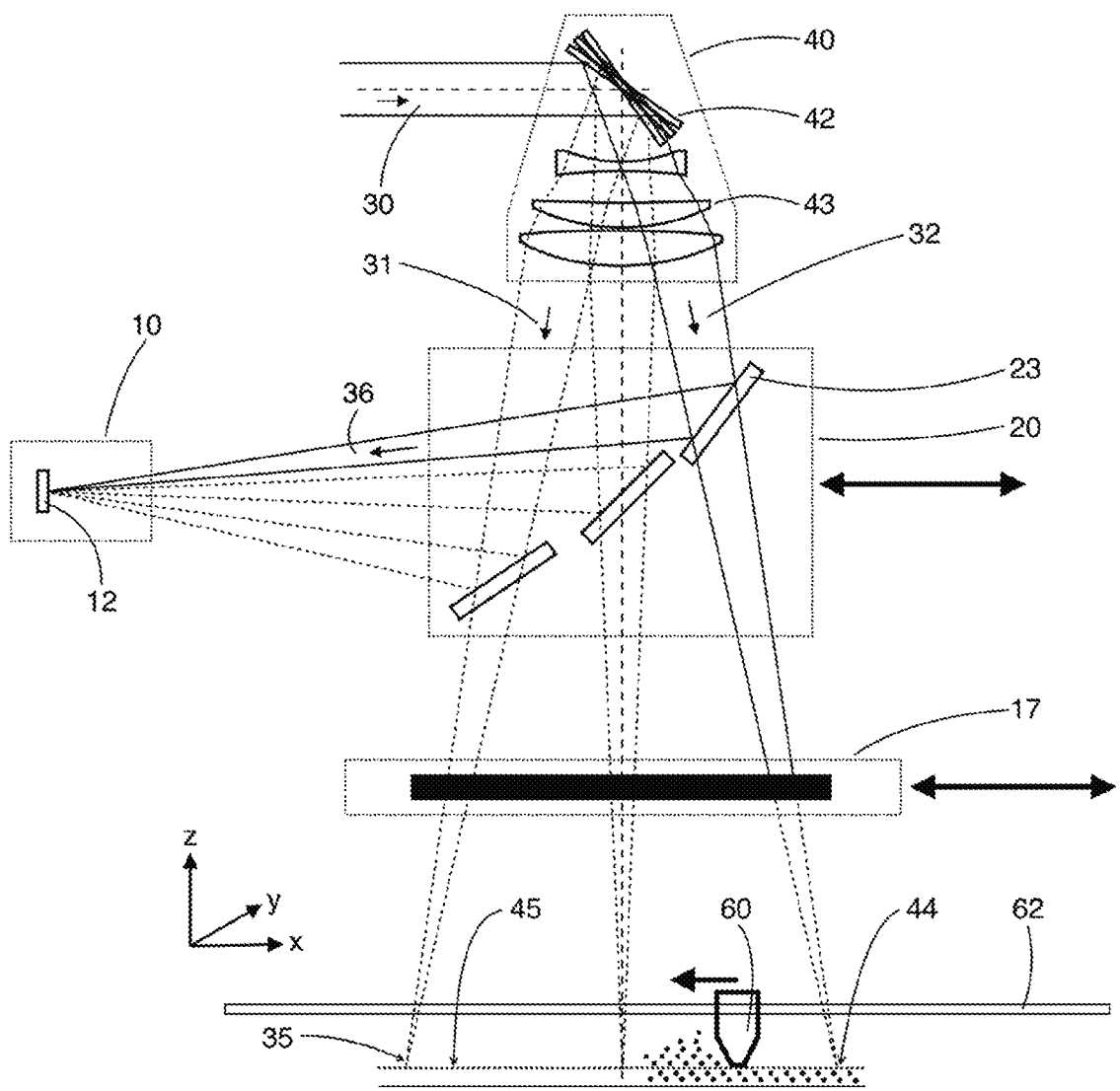
FIG. 14: A schematic representation of the invention in a configuration with a third option for the arrangement of the measuring device and with an eleventh configuration of the beam-sampling module.

The configuration shown in FIG. 14 is similar to that shown in FIG. 13. In this configuration, the beam sampling module 20 includes a number of deflection mirrors 23. Each deflecting mirror 23 directs a beam component 36 corresponding to a processing coordinate 44 in the processing plane 45 onto the detector 12 in the measuring device 10. Tracking of the beam sampling module 20 is therefore not required. The beam sampling module 20 only needs to be displaceable from a park position outside the processing space to a measurement position in the beam path between the beam deflecting device 40 and the processing plane 45.

Figure 15:
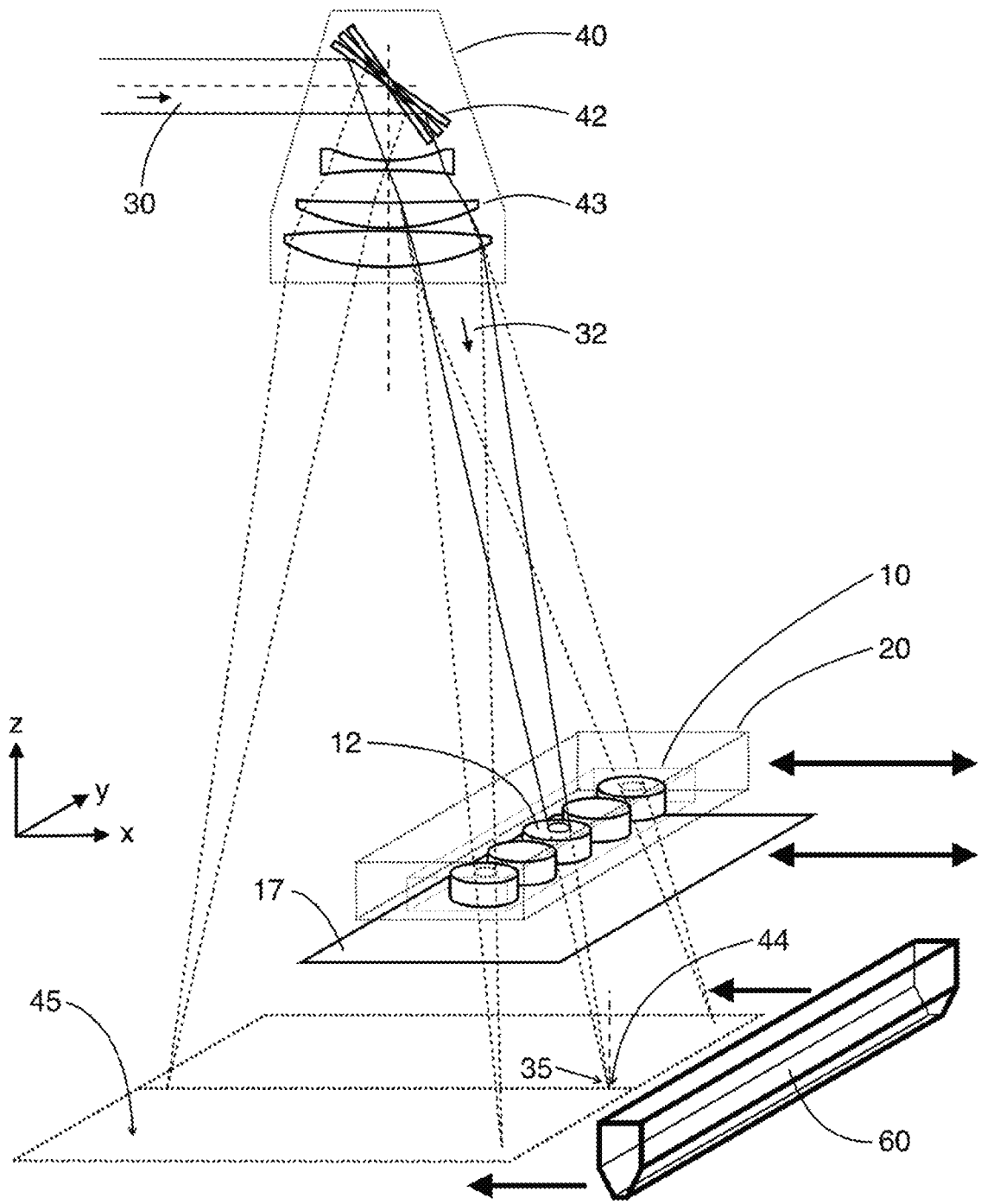
FIG. 15: A schematic representation of the invention in a configuration with a second option for the arrangement of the measuring device and with a twelfth configuration of the beam-sampling module.

FIG. 15 is a representation of the invention in another configuration with the second arrangement option of the measuring device 10. The measuring device 10 is part of the beam sampling module 20. The measuring device 10 has at least one radiation detector 12, or as shown here, a number of radiation detectors 12, which may be arranged, for example, at different positions in the y direction. The radiation detectors 12 are in this case formed to detect a beam cross section of the focused beam 32. Tracking of the beam sampling module 20 is required only in the x-direction. The tracking of the beam sampling module 20 can be coupled with the movement of the wiper 60.

Figure 16A:
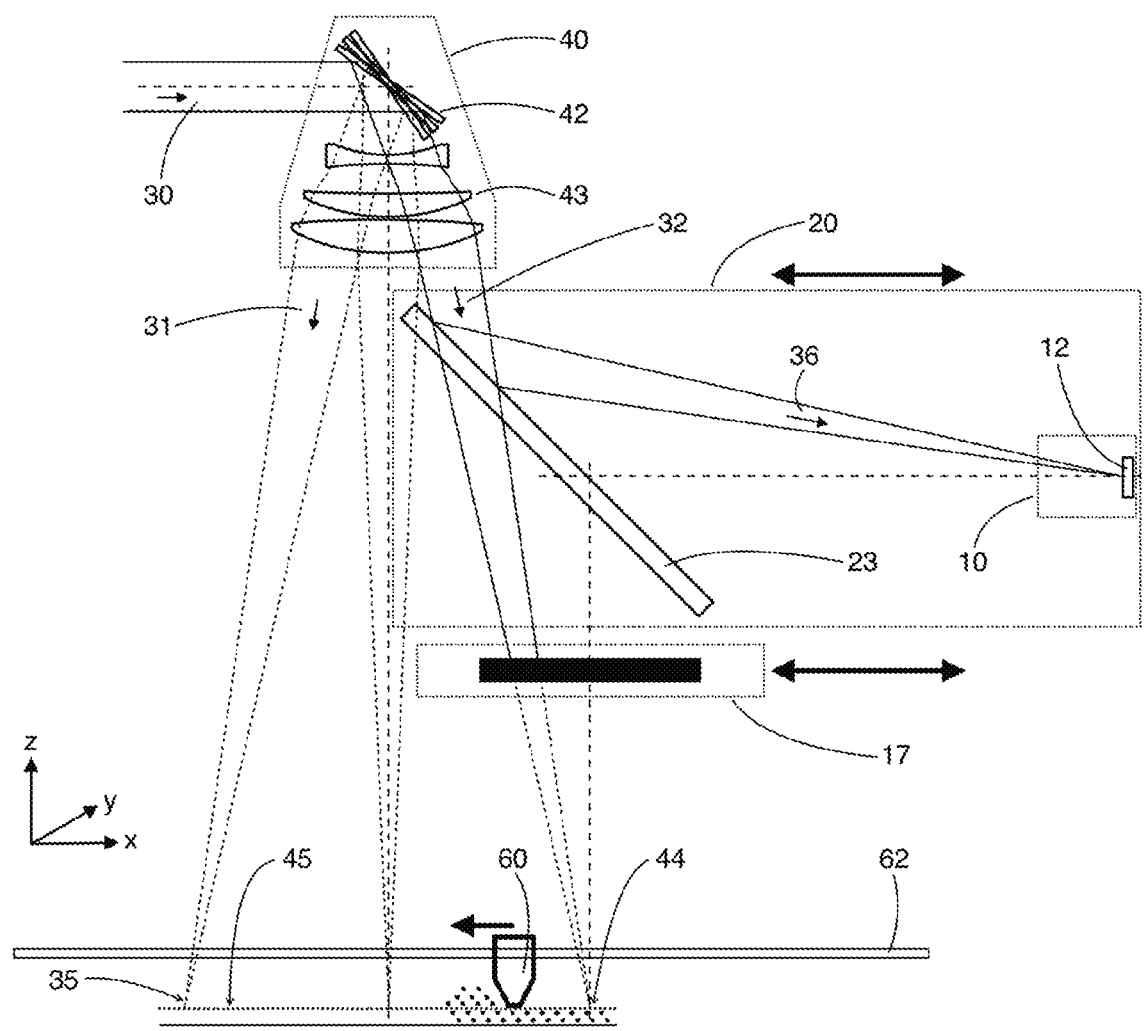
FIG. 16a: A schematic representation of the invention in a configuration with a second option for the arrangement of the measuring device and with a thirteenth configuration of the beam-sampling module showing the beam sampling module in a position for measuring a beam deflected in the +x direction.
Figure 16B:
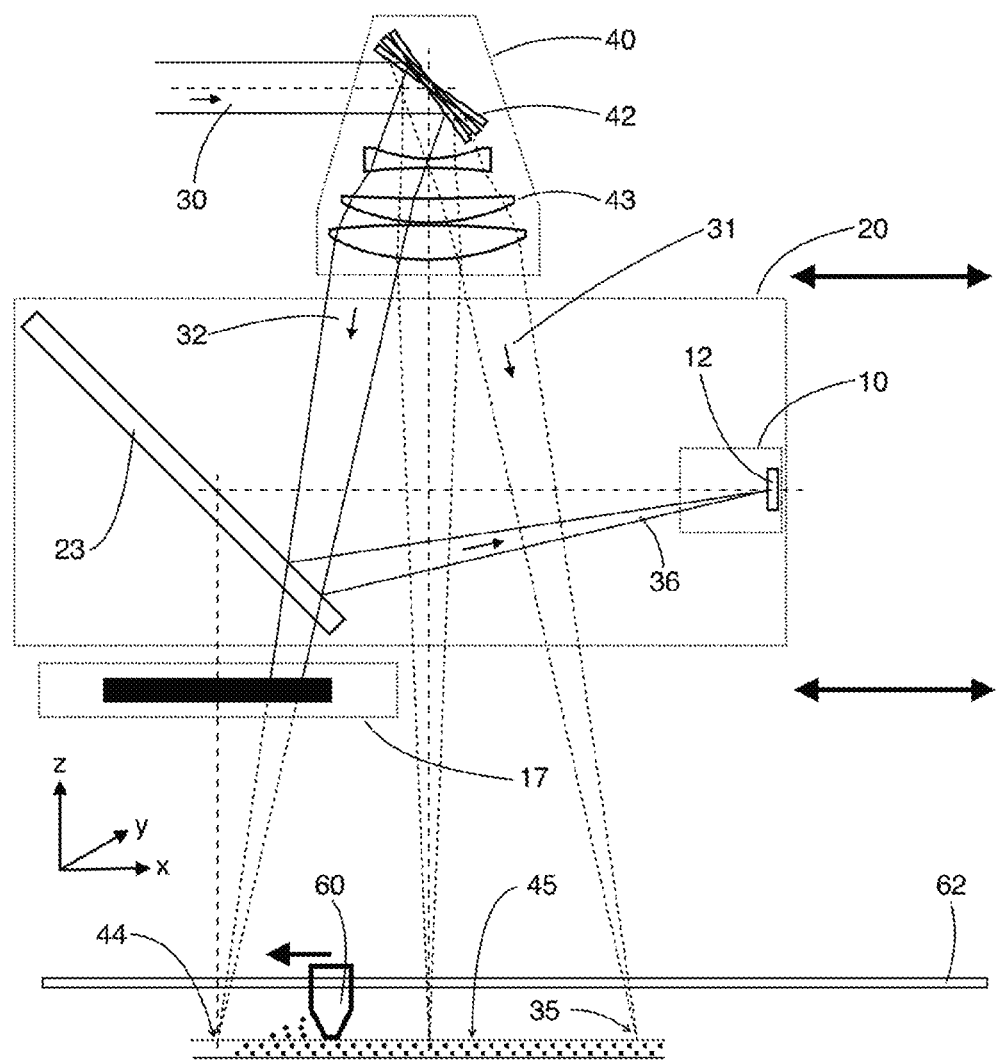
FIG. 16b: A schematic representation of the invention in a configuration with a second option for the arrangement of the measuring device and with a thirteenth configuration of the beam-sampling module showing the beam sampling module in a position for measuring a beam deflected in the −x direction.

FIGS. 16a and 16b show another configuration of the invention with the second arrangement option of the measuring device 10. The beam sampling module 20 in this case comprises the measuring device 10 with a radiation detector 12 and a deflection mirror 23 with an at least partially reflecting surface. The beam sampling module 20 is arranged movable in both axes x and y parallel to the processing plane 45. By tracking the beam sampling module 20 in both axes x, y, each processing coordinate 44 in the processing plane 45 can thus be addressed and a beam component 36 can be guided out of the focused beam 32 onto the detector 12. Alternatively, the measuring device 10 may comprise a number of radiation detectors 12, which can be arranged successively in the direction of the y-axis, for example, whereby different points along the y-coordinate axis are simultaneously addressable. Tracking of the beam sampling module 20 will then only be required along the x-axis to address different points corresponding to the x-axis in the processing plane 45. In this case, the tracking of the beam sampling module 20 may be coupled with the movement of the coating applicator (squeegee) 60. FIG. 16a shows the beam sampling module 20 in a position for measuring a beam 32 deflected in the +x direction, while FIG. 16b shows the measurement of a beam 32 deflected in the −x direction.

Figure 17A:
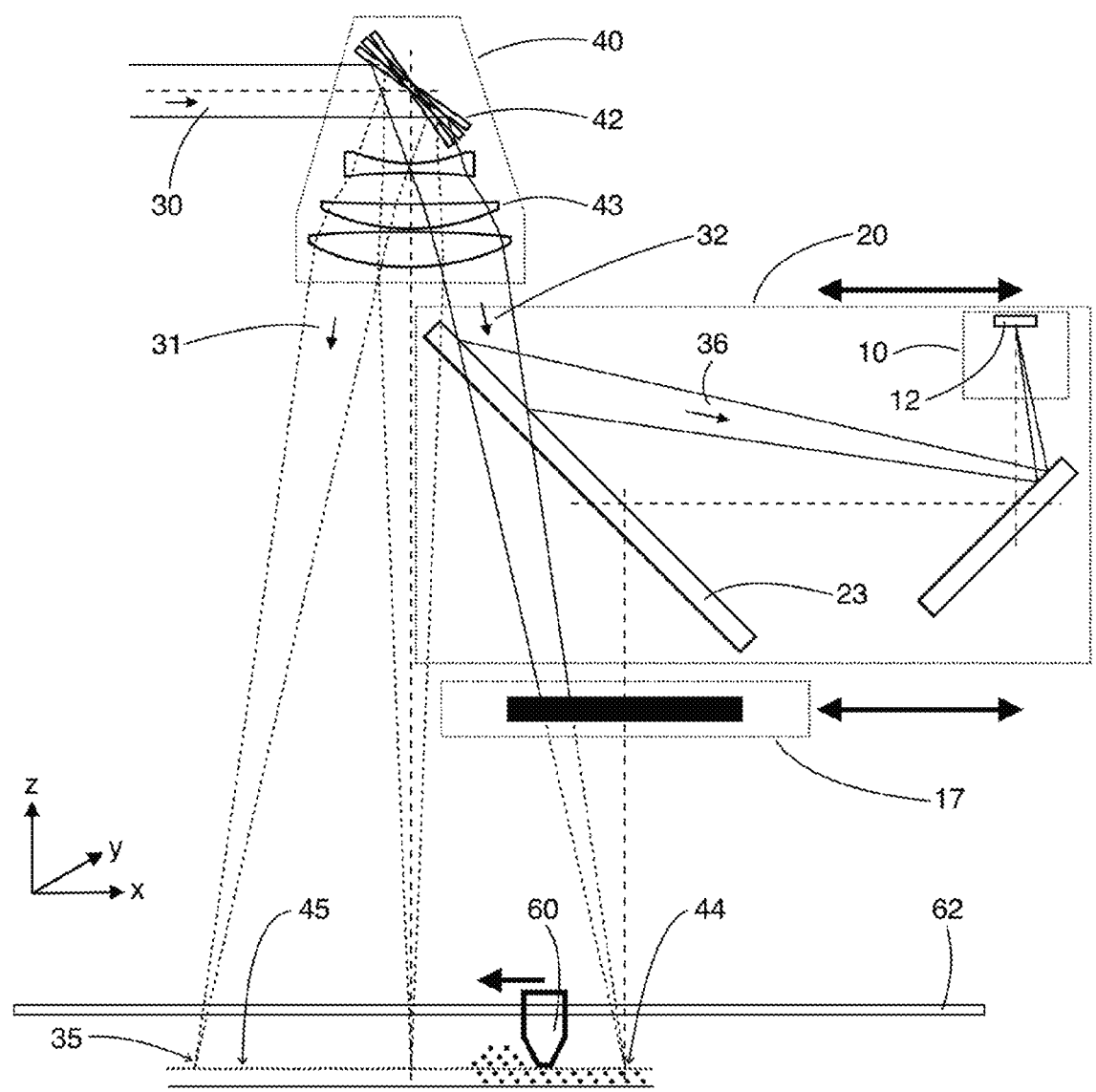
FIG. 17a: A schematic representation of the invention in a configuration with a second option for the arrangement of the measuring device and with a fourteenth configuration of the beam-sampling module showing the beam sampling module in a position for measuring a beam deflected in the +x direction.
Figure 17B:
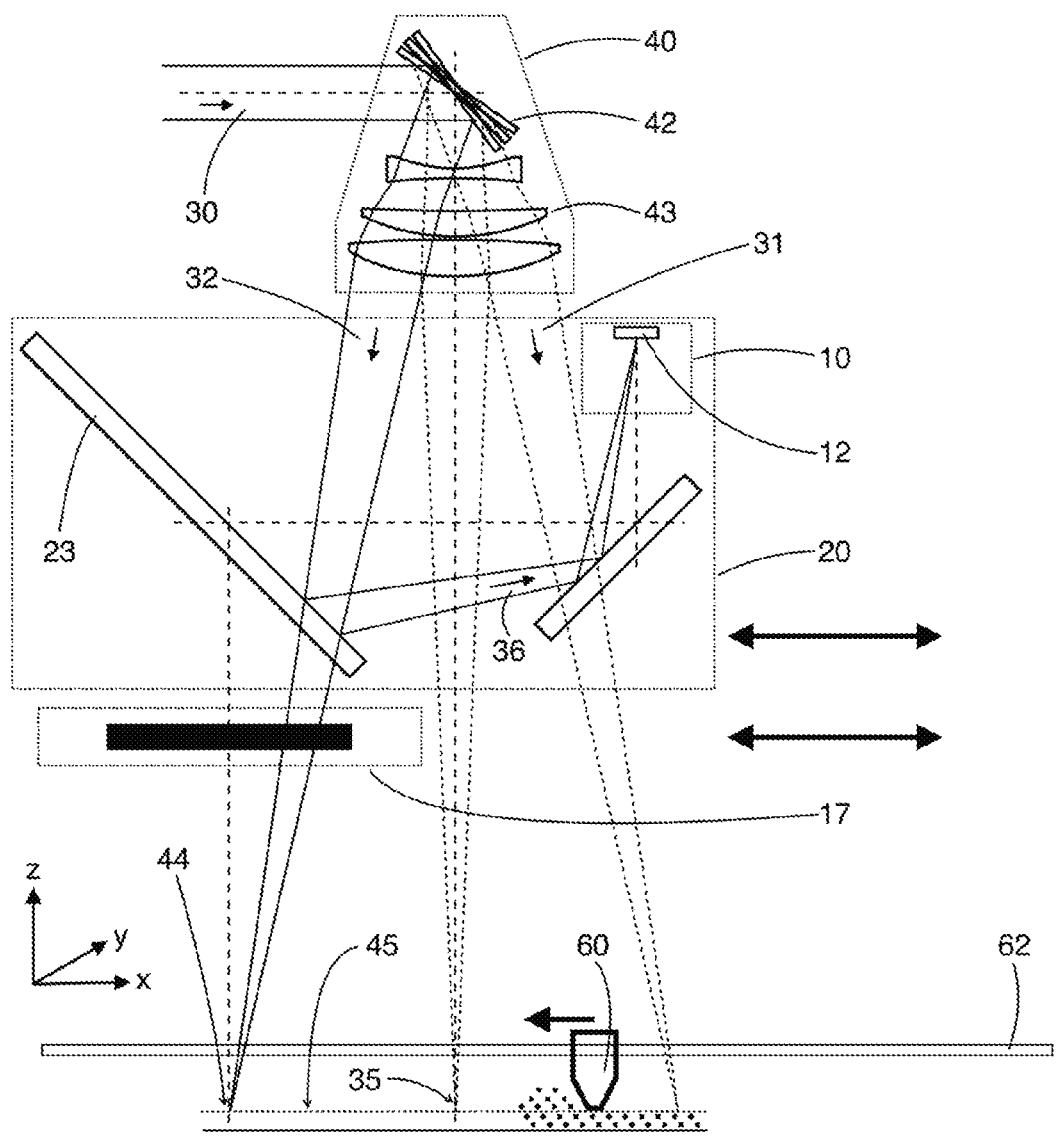
FIG. 17b: A schematic representation of the invention in a configuration with a second option for the arrangement of the measuring device and with a fourteenth configuration of the beam-sampling module showing the beam sampling module in a position for measuring a beam deflected in the −x direction.

FIGS. 17a and 17b show yet another configuration of the invention with the second arrangement option the measuring device 10. This version differs from the configuration shown in FIGS. 16a, 16b only by a second deflection mirror, which is additionally arranged in the beam sampling module 20. FIG. 17a shows the beam sampling module 20 in a position for measuring a beam 32 deflected in the +x direction, while FIG. 17b shows the measurement of a beam 32 deflected in the −x direction. The second deflection of the beam portion 36 can be used for additional attenuation of the radiation. If the second deflection takes place, as shown, in the same plane as the first deflection at the deflection mirror 23, then a reduction in the angular dependence of the reflected radiation can be achieved, since a reflection at a smaller angle is compensated with a reflection at a greater angle and vice versa. If, in an alternative configuration (not shown), the second deflection takes place in a plane perpendicular to the first deflection on the deflection mirror 23, in other words, out of the plane of drawn in FIGS. 17a, 17b, then a reduction in the polarization dependence of the reflected radiation can be achieved.

Figure 18:
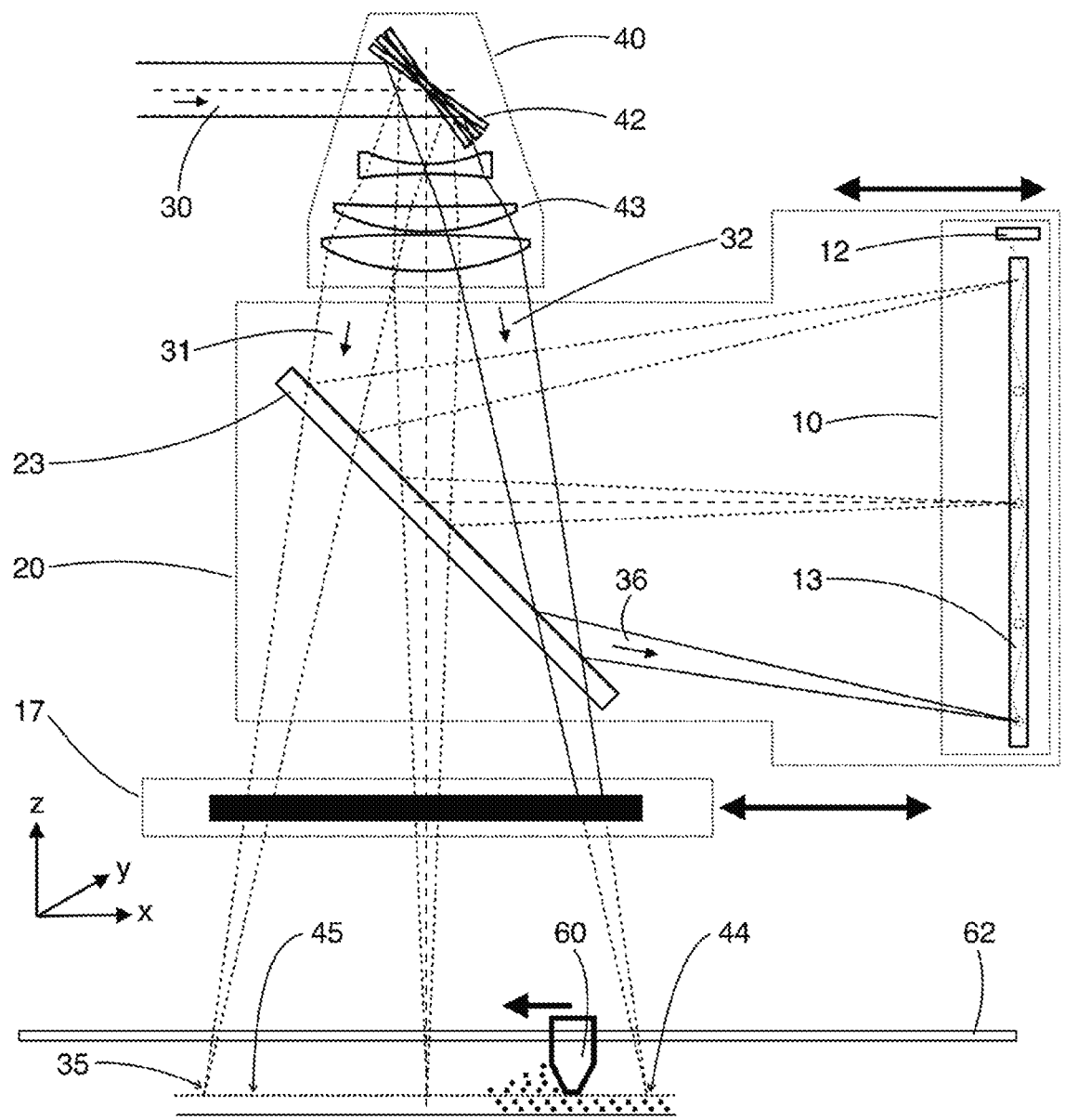
FIG. 18: A schematic representation of the invention in a configuration with a second option for the arrangement of the measuring device and with a fifteenth configuration of the beam-sampling module.

FIG. 18 shows another possible configuration of the beam sampling module 20 in a second arrangement option of the measuring device 10. In this case, the measuring device 10 includes a target 13 in addition to a radiation detector 12 that is arranged in a virtual plane, which is defined by the reflection of the processing plane 45 at the deflection mirror 23. The target 13 is configured here by way of example as a transparent plate with a pattern of light-scattering structures. Radiation from the focused beam 32 or beam portion 36 which strikes the light scattering structures in the target is scattered and propagates partially within the transparent panel by total reflection. A portion of the scattered radiation is detected by the radiation detector 12.

DETAILED DESCRIPTION OF THE INVENTION

It is intended to provide a solution to the problem that an analysis of energy radiation at the processing plane in additive manufacturing systems is not possible with sufficient accuracy and/or not all parameters due to the lack of accessibility of the processing plane during the manufacturing process of a component, however this is required for optimal process control.

In particular, the following sub-problems and tasks have to be solved:

a. No elements or measuring equipment may be placed at the processing plane and immediately above during the manufacturing process of a component.
b. A solidified layer and a layer applied to unsolidified construction material shall not be affected or altered by impinging energy radiation.
c. The production process should ideally not be extended in time by the recording of beam data.
d. The energy beam should also be detectable during an ongoing production process, with as many properties relevant in the processing plane as possible, such as power, diameter, and position.

The task is solved by the present invention according to the features of the independent claims.

The invention is applicable in systems for the additive manufacturing of components 70, in which a construction material 55 applied in layers on a component platform 50 is solidified by means of an energy beam 30. For this purpose, the system also has a beam deflecting device 40 for positioning a beam focus 35 in a processing plane 45 and a layer applicator 60. The device according to the invention includes a beam barrier 17, a beam sampling module 20, and a measuring device 10.

The beam barrier 17 and the beam sampling module 20 are movable. During solidification of a layer with the energy beam 30, the beam barrier 17 and the beam sampling module 20 are in a park position that is outside the space defined by the possible beam paths between the beam deflecting device 40 and the processing plane 45 so that the beam paths of the laser beam 31, 32 focused on the processing plane 45 are not obstructed. To determine at least one beam datum or multiple beam data, the beam barrier 17 and the beam sampling module 20 are positioned in the beam path between the beam deflecting device 40 and the processing plane 45. The period before or after the consolidation of a layer is used for this purpose. This may be, for example, the period in which a layer of the construction material 55 is applied by means of the layer applicator. The beam barrier 17 ensures that neither the laser beam 30 which is switched on to carry out a measurement nor a portion of the beam which is transmitted, redirected or reflected by the beam sampling module 20 strikes the processing plane 45. In the simplest case, the beam barrier 17 may, for example, include a housing or a plate of non-transparent material such as metal or ceramic. The beam sampling module 20 has the function of directing the energy beam 32, which is aligned by the beam deflecting device 40 to a selected processing coordinate 44, or at least a beam portion 36 of the energy beam 32 onto the measuring device 10. Various beam sampling module 20 configuration options are provided for this purpose. Furthermore, various options for arranging the measuring device 10 and for designing the measuring device 10 are provided.

The measuring device 10 may be coupled in a first proposed configuration of the invention with the beam feed. This arrangement of the measuring device 10 is shown under numeral 10a in FIG. 1. In this configuration, an output coupling mirror 15 is provided in the beam feed of the energy beam 30 to the beam deflecting device 40, behind which the measuring device 10 is located. The output coupling mirror 15 is, for example, a low-reflection mirror which uncouples a fraction of the radiation which passes through the beam deflecting device 40 in the rearward direction to the energy beam 30. The output coupling mirror 15 directs the uncoupled radiation to the measuring device 10. In this configuration, the measuring device 10 comprises a radiation detector 12 and means 14 for focusing radiation, such as a lens, an objective lens, a lens array, an adjustable focus lens, a fluid lens, an axially displaceable lens, or similar.

Many design options of the beam sampling module 20 are provided in the first configuration with a measuring device 10 coupled to the beam feed, which are shown by way of example in FIGS. 2 to 9. A common feature in these configurations is that the beam sampling module 20 has at least one beam guiding element 22 with an at least partially reflecting spherical surface. The spherical surface can be any section of a spherical surface. The section of the spherical surface is at least large enough so that the focused beam 32 directed by the beam deflecting device 40 onto the processing coordinate 44 can be captured by the beam guiding element 22 with its entire cross section. The beam sampling module 20 can be placed in a position corresponding to the selected processing coordinate 44. In this position, the center of curvature of the spherical surface of the beam guiding element 22 coincides either with the selected processing coordinate 44 in the processing plane 45, or with a point corresponding to the selected processing coordinate 44 in a virtual plane corresponding to the processing plane 45. The corresponding virtual plane may be defined by representing or mirroring the processing plane 45. If the focused energy beam or laser beam 32 is precisely aligned with the selected processing coordinate 44, then the wavefront of the focused beam 32 is concentric with the spherical surface of the beam-guiding element 22. The laser beam 32 is thus reflected back in itself, passes backwards through the beam deflecting device 40 and is replicated by the output coupling mirror 15 onto the detector 12 of the measuring device 10 after coupling. Thus, an exact image of the focused laser beam 32 (produced by the laser beam focus 35) is produced in the coordinate 44 on the detector 12. The beam diameter can be determined by means of the detector 12, for example. If the beam focus 35 is exactly aligned with the coordinate 44, then the image of the beam focus is centered on the detector 12. If the beam focus 35 is only slightly adjacent to the coordinate 44, such as due to a positioning error of the beam deflecting device 40 or because of a thermal gradient in the scan lens 43, then the wavefront is slightly displaced from the spherical surface and the beam is reflected back at a slight angle. The image of the beam focus on the detector 12 will be decentered in this case. A beam position deviation in the processing plane 45 can thus be determined from the lateral deviation of the image position on the detector 12. The beam position deviation determined in this way can be made available to the system's process control as a correction value for the consolidation of the next layer.

The detector 12 could, for example, be a spatial resolution, pixel-based sensor such as a CCD (charge coupled device), or a CMOS camera.

In the simplest case of the first configuration, the beam sampling module 20 includes a beam guiding element 22 with only one spherical surface. In that case, the beam sampling module 20 must be movable in two axes parallel to the processing plane 45 to detect the beam at a number of processing coordinates extending over the entire processing plane 45. FIG. 2 shows such a configuration. The two coordinate axes that span the processing plane 45 are labeled x and y.

In another version of the first configuration, the beam sampling module 20 includes a number of beam guiding elements 22 with a spherical surface or a beam guiding element 22 with a number of spherical surfaces. Each spherical surface can address a processing coordinate with the associated center of curvature. The beam guiding elements 22 or the spherical surfaces can be arranged along the y-coordinate at different positions successively in the beam-sampling module 20, for example, as shown in FIG. 3. For detecting the beam at a number of points distributed over the processing plane 45, it is sufficient to move the beam sampling module 20 along the other axis, in this case along the x-axis.

The beam data is preferably recorded before or after the solidification of a single layer. The beam data can be recorded during the period in which a layer of new construction material 55 is applied by means of the layer applicator (wiper, squeegee) 60. The layer-applying device 60 is typically guided by means of a drive and a guide 62 over the component platform 50 which is lowered by a layer thickness for this purpose. The displacement axis of the beam sampling module 20 may be parallel to the axis of the layer applicator 60 guide 62. The displacement of the beam sample extraction module 20 may be coupled to the movement of the layer applicator 60. The coupling may be timed, in other words, the beam sample extraction module 20 may be displaceable by means of its own guide and its own drive and it may be moved simultaneously with the layer application. The coupling may also be mechanical, i.e., the beam sampling module 20 may be mechanically connected to the layer applicator 60. For example, the beam sampling module 20 and the beam barrier 17 may be "piggybacked" on or to the layer applicator 60.

In another version of the first configuration, several beam guiding elements 22 may also be arranged in the form of a two-dimensional grid, a matrix, or an array in the beam-sampling module 20. Such a version is shown in FIG. 5 In this version, it is sufficient to position the beam sampling module 20 and the beam barrier 17 centrally above the processing plane 45 for the measurement. The beam sampling module 20 moving device and the beam barrier 17 is in this case only required to move the beam sampling module 20 and the beam barrier 17 from a park position outside the processing space into a measuring position and can have a simpler design accordingly.

A larger number of points or selected processing coordinates 44 can be addressed if different suitable spherical sections or segments are used for the spherical surface of the beam guiding elements 22, which are only slightly larger than the beam cross section of the focused laser beam 32. The beam guiding elements 22 can then be arranged more densely, so that correspondingly a larger number of beam guiding elements 22 can be placed in the beam sampling module 20. This option is shown in FIG. 6.

In the aspect of a first configuration option shown in FIG. 7, a number of elongated spherical-surface segments are arranged as beam-guiding elements 22 along the x-axis in the beam-sampling module 20. Therefore, no displacement along the x-axis is required to record multiple points distributed over the processing plane, but only along the y-axis. For this purpose, the spherical surface segments must be extended accordingly in the y-direction. To couple the displacement appropriately with the movement of the wiper 60, it is, however, more useful if the spherical surface segments are oriented in the same oblong direction, in which the wiper is guided over the processing plane 45, i.e., in the direction of X axis. Such a configuration is shown in FIG. 8.

In another first configuration option of the invention, the centers of curvature of the beam guiding elements' 22 spherical surfaces are not aligned with the processing plane 45 itself but with a virtual plane 46 corresponding to the processing plane 45. The virtual corresponding plane 46 can be defined, for example, by reflection with a deflection mirror 23. Such a configuration is shown in FIG. 9. The beam sampling module 20 includes a deflection mirror 23 in addition to one or more beam guiding elements 22. The deflection mirror 23 has an at least partially reflecting surface on which the focused beams 31, 32 that are aligned by the beam deflecting device 40 are mirrored. The focus points of the reflected rays then form the virtual corresponding plane 46. Such a configuration may be advantageous, on the one hand to be able to place the beam barrier 17 as far away as possible from the processing plane 45, furthermore to reduce the intensity of the radiation on the spherical surfaces of the beam guiding elements 22 and finally as close as possible to the spherical surfaces to be arranged on the virtual corresponding plane 46, so that the sections of the spherical surfaces can be relatively small and consequently a large number of spherical surfaces can be arranged in a grid and a correspondingly large number of different processing coordinates 44 can be addressed. FIG. 9 shows an exemplary configuration for this.

The measuring device 10 can also be placed at positions other than at the beam feed to the beam deflecting device 40 (corresponding to numeral 10a in FIG. 1). In a second arrangement option, the measuring device 10 can also be a component of the beam sampling module 20 (see numeral 10b in FIG. 1).

In the second arrangement option of the measuring device 10, there are also many design options for recording the beam data at a number of points corresponding to processing coordinates 44 in the processing plane 45. A number of points can be addressed by a number of radiation detectors 12 distributed in one or two coordinate directions, or by a movement of the beam sampling module 20 in one or two coordinate directions. Both options can also be combined, i.e., a number of detectors can be distributed along the one coordinate direction and the beam sampling module 20 can be displaceable or traceable in the other coordinate direction. FIGS. 10, 15, 16a, 16b, 17a, 17b, and 18 show exemplary configurations.

In a third arrangement option of the measuring device 10, the measuring device 10 is located at a fixed position outside the processing space, which is defined by the possible beam paths of the focused laser beams 31, 32 between the beam deflecting device 40 and the processing Level 45. The beam sampling module 20 here comprises at least one deflection mirror 23 with an at least partially reflecting surface. A beam portion 36 is guided from the focused laser beam 32 to the measuring device 10 with the deflection mirror 23. As with the second arrangement option of the measuring device 10, a number of points can be addressed here by a number of radiation detectors 12 (see FIG. 11), by a displacement or tracking of the beam sampling module 20 (see FIG. 13), or by a combination of both methods. There yet another possible measure, illustrated in FIG. 14: the beam sampling module 20 may comprise a number of deflection mirrors 23 arranged at different locations at different angles in the beam sampling module 20 to direct beam portions 36 from the focused beams 31, 32, which are aligned to different coordinates 44 in the processing plane 45, to a detector 12 in the measuring device 10.

A fourth possible arrangement of the measuring device 10 results from the third arrangement, in which the measuring device 10 is not arranged at a fixed position, but movable outside the processing space. This configuration is shown in FIG. 12. This makes it possible to record beam data at a number of points corresponding to processing coordinates 44 in the processing plane 45 as well.

In a simple configuration of the second arrangement option of the measuring device 10, the measuring device 10 is part of the beam sampling module 20. The beam detector 12 of the measuring device 10 may be a spatial resolution, pixel-based sensor (CCD or CMOS camera). In such a simple configuration, the laser beam 30 can be operated only at very low power to record beam data. Therefore, the beam sampling module 20 may also include a means of beam attenuation, such as partially reflective mirrors, neutral density filters, or something similar. The beam sampling module 20 may also include mirrors located in front of the radiation detector 12 and directing most of the beam power to a beam attenuator or absorber placed outside the processing space.

As an alternative to a spatial resolution, pixel-based sensor, the radiation detector 12 may be a power measuring head or designed as a ballistic detector. A ballistic detector essentially includes a radiation-absorbing surface coupled to a thermally-isolated volume having a defined heat capacity, and a temperature sensor coupled to the thermally isolated volume. If a laser pulse is sent to the ballistic detector or the laser beam is turned on for a limited period of time, then the absorbed energy of the beam results in a temperature increase of the thermally isolated volume, from which the energy of the laser beam and thus also its performance can be determined with very high accuracy. The housing of the power measuring head, the ballistic detector or the beam sampling module 20, which includes the measuring head or the detector, can be designed as a beam barrier 17 simultaneously. As shown in FIG. 15, the beam sampling module 20 may also include a number of adjacent power probes or ballistic detectors, which can thus determine the beam power at a number of points corresponding to processing coordinates 44. The beam sampling module 20 may be coupled to the movement of the layer applicator 60. In this way, beam power can be measured in a relatively compact and simple fashion at a number of points or processing coordinates 44 distributed over the entire processing plane 45 at each layer application cycle during the manufacturing process of a component 70, without increasing the cycle duration and thus the overall production time. The measured power values can be transmitted to the higher-level process control and used to adapt the laser parameters in the subsequent layer solidification.

In another possible configuration, the measuring device 10 may include a target 13 in addition to a radiation detector 12. The target 13 is a plate with specific regions in which the interaction with radiation differs in reflection, transmission, absorption, or scattering from the rest of the plate. The target 13 may, for example, have a perforated grid plate. The plate may also have beam guiding properties by total reflection at the interfaces of the plate. The target 13 can also be configured as a transparent plate with a pattern of light-scattering structures. For example, in these configurations, the radiation detector 12 may be a photodiode placed in the vicinity of the target 13 and detecting a portion of the scattered light generated by reflection, transmission, or scattering when radiation from the focused beam 32 or from the beam portion 36 encounters the light-scattering structures or the specific areas in the target 13. The light-scattering structures or the special areas may, for example, be generally in the form of dots or linear. A relative movement between the focused beam 32 or the beam portion 36 and the target 13 is generated to record beam data. The relative movement can be generated by aligning the beam with the beam deflecting device 40, with the tracking of the beam sampling module 20, or with a displacement of the measuring device 10. A beam diameter can be determined from the signal of the radiation detector 12, for example. FIG. 18 shows a possible configuration in which the target 13 is arranged in a virtual plane that is defined by the reflection of the processing plane 45 on a deflection mirror 23.

In the configuration of the invention, a number of measuring devices 10 can be used in combination. Only a fraction of the beam power is usually needed to record spatially resolved parameters such as the beam diameter or a beam position deviation. In the arrangements described, usually only a very small proportion of the beam 36 is directed from the focused beam 32 onto the measuring device 10 by means of a beam guiding element 22 or by means of a deflection mirror 23 for this purpose. The major portion of the radiation is stopped by the beam barrier 17. It is therefore also envisaged to place a second measuring device in addition to the measuring device 10 on the beam barrier 17 or on the beam sampling module 20. The second measuring device can be arranged, for example, between a beam guiding element 22 or a deflection mirror 23 and the beam barrier 17, and can be moved together with the beam barrier 17 and the beam sampling module 20. The second measuring device, in particular, can be designed as a power measuring head or as a ballistic detector. It is also provided that the second measuring device designed as a power measuring head or as a ballistic detector forms the beam barrier 17 simultaneously.

The proposed methods and devices have a number of advantages due to their features as invented:

- The beam properties can be detected as related to position, which the beam has at different machining position, although not measured in the processing plane itself.
- The beam data can be determined practically online, in other words, during the ongoing production process and used for process control and/or for ongoing post-calibration.
- No components of the device or measuring means need to be placed in the processing plane or in the area immediately above the processing plane.
- The component area and the construction material are not hit by radiation when determining the beam data.
- The process course does not need to be changed.
- The production duration is not increased.
- The device can be retrofitted into existing additive manufacturing systems.

The invention is not limited to the configurations described and shown in the figures. In the configuration of the measuring device 10, for example, further customary measures and techniques known to the experts in the art can be used to record different beam data and beam parameters. For example, it is also possible to use devices for determining a beam caustic. For this purpose, for example, the detector 12 or the means 14 for focusing can be mounted axially displaceable in order to scan the beam along its axis in a number of cross sections.

LIST OF REFERENCE NUMBERS

10 Measuring device
10a Measuring device, coupled to beam feed
10b Measuring device, integrated in beam sampling module
10c Measuring device, arranged outside the processing space
12 Radiation detector
13 Target
14 Means of focusing
15 Output coupling mirror
17 Beam barrier
20 Beam sampling module
22 Beam guiding element
23 Deflection mirror
30 Laser beam (energy beam)
31 Focused laser beam
32 Focused laser beam
35 Laser beam focus
36 Beam portion
40 Beam deflecting device
42 Scanner mirror
43 Scan lens
44 Coordinate point in processing plane
45 Processing plane
46 Corresponding virtual plane
50 Component platform
51 Reservoir for construction material
52 Reservoir for excess construction material
55 Construction material
60 Layer applicator (wiper, squeegee)
62 Guide and drive for wiper
70 Component

The invention claimed is:

1. A method for measuring at least one beam datum in a system for the additive manufacturing of components by layered solidification of a powdery construction material with an energy beam, the system comprising a beam deflecting device including at least one scan mirror, a layer applicator, a component platform, and a processing plane with processing coordinates, the processing coordinates being locations of the powdery construction material to which the beam deflecting device can direct the beam for forming a beam focus for selective local solidification of the powdery construction material, the method comprising the following step during the additive manufacturing process of a single component by selective laser melting:
a) applying, by means of the layer applicator, a new layer of the powdery construction material to the component platform on top of a previous layer of the powdery construction material, which has been previously applied onto the component platform and selectively solidified by means of the beam forming a beam focus in the processing plane, wherein the method further comprises performing the following steps during the additive manufacturing process of the single component for a plurality of different selected ones of the processing coordinates:
b) positioning a beam barrier in a beam path between the beam deflecting device and at least a respective one of the plurality of different selected ones of the processing coordinates,
c) positioning a beam sampling module in the beam path between the beam deflecting device and at least the respective one of the plurality of different selected ones of the processing coordinates,
d) aligning the beam deflecting device with the respective one of the plurality of different selected ones of the processing coordinates,
e) turning on the beam for a limited period of time,
f) directing at least a portion of the beam aligned by the beam deflecting device in the direction of the respective one of the plurality of different selected ones of the processing coordinates to a measuring device with a radiation detector, g) determining at least one respective beam datum by means of the measuring device, wherein the at least one respective beam datum is a deviation of the beam position within the processing plane from the respective one of the plurality of different selected ones of the processing coordinates, wherein the positioning of the beam barrier and the positioning of the beam sampling module are coupled to the movement of the layer applicator, wherein the beam barrier and the beam sampling module remain positioned, at least during steps e) and f) that are performed during step a), in accordance with steps b) and c) above the processing plane at a distance from the processing plane as well as in the beam path between the beam deflecting device and at least the respective one of the plurality of selected ones of the processing coordinates in the processing plane at the same time, the beam barrier preventing the beam from striking the processing plane, and wherein the steps b) to g) are carried out during the additive manufacturing process of the single component in a period of time after the solidification of the previous layer of the component, such that during performing step a), and before solidification of the new layer, wherein the beam is sequentially aligned, by means of the beam deflecting device, with each of the plurality of different selected ones of the processing coordinates and the at least one respective beam datum is recorded at each of the plurality of different selected ones of the processing coordinates, such that the at least one respective beam datum is individually measured for each of the plurality of different selected ones of the processing coordinates in the same period of time after the solidification of the previous layer of the component, and before solidification of the new layer.

2. The method according to claim 1, wherein each of the at least one respective beam datums, which are determined by means of the measuring device, or respective values derived therefrom, are transmitted to a process control unit.

3. The method according to claim 1, wherein the beam sampling module is placed in a position corresponding to at least the respective one of the plurality of different selected ones of the processing coordinates, wherein the corresponding position in at least one of the coordinate axes x or y spanning the processing plane matches at least the respective one of the plurality of different selected ones of the processing coordinates.

4. The method according to claim 1, wherein the determination of at least one respective beam datums additionally comprises the determination of one or more of the following parameters at the corresponding respective ones of the plurality of different selective ones of the processing coordinates: beam power, beam energy, beam intensity, beam diameter, beam position on the processing plane, axial focus position, axial focus position deviation from the processing plane, beam deflection speed.

5. Use of the method according to claim 1 an additive manufacturing process of a component by layered solidification of a powdery construction material, wherein beam data is recorded either before each selective solidification of a single powder layer or at least regularly after application and selective solidification of a number of powder layers before the next powder layer is selectively solidified.

6. The method according to claim 1, wherein the determined beam data is used to calibrate the beam deflecting device.

7. A system for the additive manufacturing of components by layered solidification of a powdery construction material by selective laser melting with an energy beam, the system comprising
 a beam deflecting device including at least one scan mirror for redirecting and aligning the beam,
 a layer applicator,
 a component platform,
 a processing plane with processing coordinates, the processing coordinates being locations of the powdery construction material to which the beam deflecting device can direct the beam for forming a beam focus for selective local solidification of the powdery construction material, and
 a device for determining in the system, for each of a plurality of different selected ones of the processing coordinates, at least one respective beam datum, wherein the system is configured to apply, by means of the layer applicator, in a powder application step during the additive manufacturing process of a single component by selective laser melting, a new layer of powdery construction material to the component platform on top of a previous layer, which has been previously applied onto the component platform and selectively solidified by means of the beam forming a beam focus in the processing plane, wherein the device includes a beam barrier, a beam sampling module, and a measuring device having a radiation detector,
 wherein the beam barrier and the beam sampling module are movable by means of a linear guide, which is aligned parallel to the processing plane, from a parking position outside of possible beam paths to in-between the beam deflecting device and the plurality of different selected ones of the processing coordinates,
 wherein the device is arranged to, during the same powder application step and before solidification of the new layer, for each of the plurality of different selected ones of the processing coordinates:
  position the beam barrier and the beam sampling module in at least a respective one of the possible beam paths between the beam deflecting device and a respective one of the plurality of different selected ones of the processing coordinates, and
  thereby position the beam barrier and the beam sampling module above the processing plane and at a distance from the processing plane in at least the respective one of the possible beam paths,
  align the beam deflecting device with the respective one of the plurality of different selected ones of the processing coordinates,
  trigger turning on the beam for a limited period of time, while the beam barrier and the beam sampling module is positioned in the beam path between the beam deflecting device and at least the respective one of the plurality of different selected ones of the processing coordinates, the beam barrier preventing the beam from striking the processing plane while the beam deflecting device is aligned with the respective one of the plurality of different selected ones of the processing coordinates, and
  direct, by the beam sampling module, at least a portion of the beam, which is aligned by the beam deflecting device in the direction of the respective one of the plurality of different selected ones of the processing coordinates, to the measuring device, wherein the measuring device is configured to determine the at least one respective beam datum from a signal of the radiation detector resulting from said portion of the beam, wherein the at least one respective beam datum is a deviation within the processing plane of the beam position from the respective one of the plurality of different selected ones of the processing coordinates,
wherein the system is adapted to, in the same powder application step and before solidification of the new layer, sequentially align the beam, by means of the beam deflecting device, with each of the plurality of different selected ones of the processing coordinates and to record, by means of the beam sampling module and the measuring device, the at least one respective beam datum at each of the plurality of different selected ones of the processing coordinates and thus to individually measure the at least one respective beam datum for each of the plurality of different selected ones of the processing coordinates.

8. The system according to claim 7, wherein the linear guide is configured, for each of the number of different selected ones of the processing coordinates, to place the beam sampling module in a position corresponding to at least the respective one of the number of different selected ones of the processing coordinates, wherein the corresponding position in at least one of the coordinate axes x or y that span the processing plane matches at least the respective one of the number of different selected ones of the processing coordinates.

9. The system according to claim 7, wherein the beam sampling module is coupled to a path length measuring device for detecting a-positions of the beam sampling module in at least one of the coordinate axes x or y.

10. The system according to claim 7, wherein an output coupling mirror is arranged in a beam feed of the beam to the beam deflecting device and is configured for uncoupling radiation, which is reflected back by the beam sampling module into and through the beam deflecting device towards the output coupling mirror, to the measurement device.

11. The system according to claim 10, wherein the beam sampling module comprises at least one beam guiding element having a segment of a partially reflecting spherical surface and wherein a center of curvature of the spherical surface is positionable, by means of the linear guide, at at least one of the plurality of different selected ones of the processing coordinates or at a point corresponding to the at least one of the plurality of different selected ones of the processing coordinates.

12. The system according to claim 7, wherein the beam sampling module comprises the measuring device and the measuring device is positionable, by means of the linear guide, together with the beam sampling module.

13. The system according to claim 7, wherein the measuring device is placed outside a processing space defined by the possible beam paths between the beam deflecting device and the processing coordinates in the processing plane.

14. The system according to claim 7, wherein the beam sampling module comprises at least one beam guiding element or at least one deflecting mirror with an at least partially reflecting surface.

15. The system according to claim 7, wherein a part of the beam-sampling module is designed as the beam barrier at the same time.

16. The system according to claim 7, wherein the beam barrier and the beam sampling module are mechanically coupled to the layer applicator and follow movements of the layer applicator.

17. The system according to claim 7, wherein the measuring device is configured to determine, individually for each of the plurality of different selected ones of the processing coordinates in addition to the respective beam datum, one or more of the following parameters: beam power, beam energy, beam intensity, beam diameter, beam position on the processing plane, axial focus position, axial focus position deviation from the processing plane, beam deflection speed.

* * * * *